United States Patent
Sanji et al.

(10) Patent No.: US 12,184,345 B2
(45) Date of Patent: Dec. 31, 2024

(54) POSITIONING SYSTEM

(71) Applicant: DENSO CORPORATION, Kariya (JP)

(72) Inventors: Kenichiro Sanji, Nisshin (JP);
Nobuyasu Okabe, Kariya (JP);
Nobuyoshi Nagai, Kariya (JP)

(73) Assignee: DENSO CORPORATION, Kariya (JP)

(*) Notice: Subject to any disclaimer, the term of this patent is extended or adjusted under 35 U.S.C. 154(b) by 384 days.

(21) Appl. No.: 17/345,066

(22) Filed: Jun. 11, 2021

(65) Prior Publication Data

US 2021/0306083 A1      Sep. 30, 2021

Related U.S. Application Data

(63) Continuation of application No. PCT/JP2019/046316, filed on Nov. 27, 2019.

(30) Foreign Application Priority Data

Dec. 14, 2018 (JP) .................................. 2018-234565

(51) Int. Cl.
*H04B 17/27* (2015.01)
*G01S 7/03* (2006.01)
(Continued)

(52) U.S. Cl.
CPC ................ *H04B 17/27* (2015.01); *G01S 7/03* (2013.01); *G01S 13/825* (2013.01); *H04W 64/006* (2013.01)

(58) Field of Classification Search
CPC ............ H04M 3/00; H04M 3/42; H04M 3/53; H04M 11/00; H04M 11/04; H04W 4/00;
(Continued)

(56) References Cited

U.S. PATENT DOCUMENTS

| 11,105,882 B2* | 8/2021 | Apostolos ............... G01S 11/02 |
| 2005/0192727 A1* | 9/2005 | Shostak .................. G07C 5/008 |
| | | 701/1 |

(Continued)

FOREIGN PATENT DOCUMENTS

| EP | 2492876 A2 | 8/2012 |
| JP | 2007170162 A | 7/2007 |

(Continued)

OTHER PUBLICATIONS

NPL Search.*

*Primary Examiner* — Van T Trieu
(74) *Attorney, Agent, or Firm* — Harness, Dickey & Pierce, P.L.C.

(57) ABSTRACT

A positioning system includes a vehicular exterior communication device and a positioning device. The vehicular exterior communication device has an antenna and a strength detector. The antenna is disposed at a side surface portion of the vehicle that receives a wireless signal transmitted from the portable terminal. The strength detector detects reception strength of the wireless signal received by the antenna. The positioning device determines whether the portable terminal is present at an operating area based on vehicular exterior device strength as the reception strength of the wireless signal from the portable terminal detected by the vehicular exterior communication device. The vehicular exterior communication device is disposed under a door of the vehicle in a posture in which a center of directivity of the antenna faces upward or downward.

18 Claims, 19 Drawing Sheets

(51) Int. Cl.
*G01S 13/82* (2006.01)
*H04W 64/00* (2009.01)

(58) Field of Classification Search
CPC .......... H04W 4/02; H04W 4/12; H04B 17/27; G01S 7/00; G01S 7/03
See application file for complete search history.

(56) References Cited

U.S. PATENT DOCUMENTS

| | | | | |
|---|---|---|---|---|
| 2011/0105097 | A1* | 5/2011 | Tadayon | H04W 4/02 |
| | | | | 455/418 |
| 2011/0195699 | A1* | 8/2011 | Tadayon | H04W 48/02 |
| | | | | 455/418 |
| 2015/0118985 | A1* | 4/2015 | Lawrence | H04B 17/27 |
| | | | | 455/226.1 |
| 2015/0218872 | A1* | 8/2015 | Breed | F02N 11/0807 |
| | | | | 701/2 |
| 2018/0316445 | A1 | 11/2018 | Hamada et al. | |
| 2019/0375372 | A1 | 12/2019 | Sanji et al. | |
| 2020/0219344 | A1* | 7/2020 | Stitt | H04B 7/043 |
| 2020/0233072 | A1 | 7/2020 | Osai et al. | |

FOREIGN PATENT DOCUMENTS

| | | |
|---|---|---|
| JP | 2010133099 A | 6/2010 |
| JP | 2011097350 A | 5/2011 |
| JP | 5438048 B2 | 3/2014 |
| JP | 2014206495 A | 10/2014 |
| JP | 2015145578 A | 8/2015 |
| JP | 2015214316 A | 12/2015 |
| JP | 2016094801 A | 5/2016 |
| JP | 2017079430 A | 4/2017 |
| JP | 6313114 B2 | 4/2018 |
| JP | 2018141771 A | 9/2018 |
| JP | 2019073960 A | 5/2019 |
| JP | 2019158765 A | 9/2019 |
| WO | WO-2018225378 A1 | 12/2018 |

* cited by examiner

| | dX (mm) | | | | |
|---|---|---|---|---|---|
| | 40 | 20 | 0 | −20 | −40 |
| dZ (mm) 17 | × | ○ | × | × | × |
| dZ (mm) 36 | × | ○ | ○ | × | × |
| dZ (mm) 46 | × | ○ | ○ | × | × |

POSITIONING SYSTEM

CROSS REFERENCE TO RELATED APPLICATIONS

The present application is a continuation application of International Patent Application No. PCT/JP2019/046316 filed on Nov. 27, 2019, which designated the U.S. and claims the benefit of priority from Japanese Patent Application No. 2018-234565 filed on Dec. 14, 2018. The entire disclosures of all of the above applications are incorporated herein by reference.

TECHNICAL FIELD

The present disclosure relates to a positioning system.

BACKGROUND

There has been known a positioning system that estimates a relative position of a portable terminal in relation to a vehicle, based on the strength of reception of a wireless signal with a radio wave in a predetermined frequency band transmitted from the portable terminal carried by a user.

SUMMARY

The present disclosure describes a positioning system for a vehicle to execute wireless communication with a portable terminal carried by a user of a vehicle by adopting a radio wave of 1 GHz or higher to determine a position of the portable terminal relative to the vehicle. The position system includes a vehicular exterior communication device and a positioning device.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
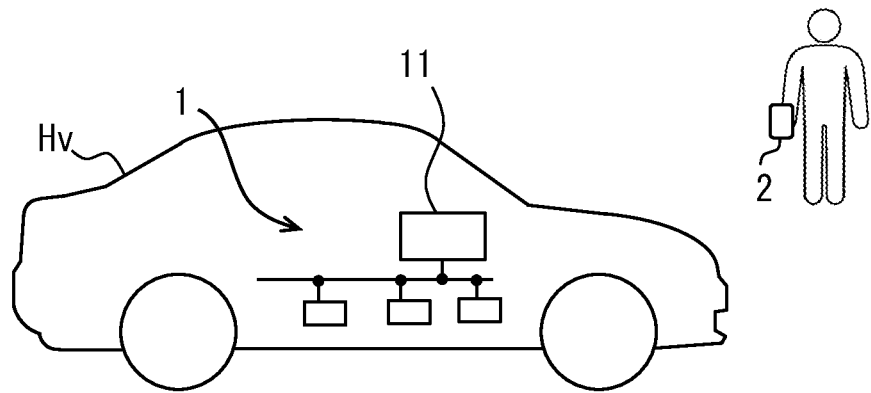
FIG. 1 is a diagram illustrating a schematic configuration of a vehicle electronic key system.

In a first comparative example, a positioning system may transmit a response request signal with a radio in an LF (Low Frequency) band from a vehicle to a portable terminal and determine whether or not the portable terminal exists in the vicinity of the vehicle outside the compartment (hereinafter referred to an operating area) based on the reception of a response signal corresponding to the response request signal. The operating area corresponds to an area that allows automatic unlocking of a door through the wireless communication executed by the portable terminal. The reason why a radio wave in the LF band is adopted for signal transmission to a portable device from a vehicle is because of limiting the arrival range of the wireless signal to the vicinity of the vehicle. The antenna for transmitting the radio wave in the LF band in the vehicle is adjusted in, for example, transmission power to allow the wireless signal reach only in the operating area.

The in-vehicle system is a passive entry passive start (PEPS) system that executes predetermined vehicle control according to the position of the portable terminal. In the PEPS system, in a situation where a user is located within a certain distance (for example, 2 meters) or longer from the vehicle in view of, for example, theft prevention, it is demanded that the automatic door unlocking through the wireless communication with the portable terminal is not executed as a system requirement. The following describes an area of prohibiting automatic door unlocking through the wireless communication with the portable terminal as a prohibiting area. The above-mentioned operating area is set to a region within two meters or shorter from the vehicle in view of the prohibiting area. Generally, the operation area is often set within 1 meter or within 0.7 meter from the vehicle.

In a second comparative example, an in-vehicle device is provided. The in-vehicle device executes wireless communication according to Bluetooth (Trademark) standard with the portable terminal carried by a user of a vehicle to estimate the position of the portable terminal relative to the vehicle. The following describes specific examples. The in-vehicle device in the first comparative example periodically transmits a request signal from a communication device (hereinafter referred to as an in-vehicle communication device) to the portable terminal for requesting the portable terminal to return the response signal. The in-vehicle communication device is disposed at the floor surface inside a vehicle compartment such as a location around a foot position of a driver seat. The portable terminal returns a response signal including an RSSI (Received Signal Strength Indication) of a request signal when receiving the request signal requesting a return of the response signal from the in-vehicle communication device. The in-vehicle device stores, in the memory, the RSSI included in the response signal returned from the mobile terminal. The in-vehicle device determines that the portable terminal is present in a vehicle compartment when an average value of the RSSIs for last five times stored in a memory exceeds a predetermined threshold. On the other hand, when the average value of the RSSIs for the last five times is equal to or less than the threshold, the in-vehicle device determines that the vehicle is present outside the vehicle compartment.

Hereinafter, a communication based on a predetermined wireless communication standard having a communication range of, for example, about several tens of meters, such as Bluetooth, will be referred to as a short-range communication. A radio wave with 1 GHz or higher (such as 2.4 GHz) may be adopted for the short-range communication. Hereinafter, the radio wave is referred to as a high-frequency radio wave. Such a high-frequency radio wave has a stronger straightness than radio wave in the LF band and is easily reflected at a metal body such as a vehicle body.

In recent years, there has been an increasing demand for portable information processing terminals such as smartphones to function as vehicle keys. Along with this situation, there is a demand for a configuration that can determine the position of a portable terminal relative to a vehicle by adopting the reception strength of the high frequency radio wave used for a short-range communication such as Bluetooth. Smartphones generally do not have a function of transmitting or receiving a radio wave in the LF band. However, the smartphones usually have a function of short-range communication such as Bluetooth as standard equipment.

The high-frequency radio wave adopted in the short-range communication such as Bluetooth has stronger straightness as compared with the radio wave in the LF band, and is easily reflected at a metal body such as a vehicle body. The high-frequency radio wave has a smaller degree of attenuation of the signal strength due to the propagation distance as compared with the radio wave in the LF band. In a configuration in which the vehicle and the portable terminal execute the short-range communication, it may be difficult to limit the communication area of the vehicle and the portable terminal to an area in the vicinity of the vehicle.

According to the configuration in the second comparative example, it is possible to determine whether the portable terminal exists inside a vehicle compartment with a certain degree of accuracy even in a configuration where the vehicle and the portable terminal execute the short-range communication. However, the second comparative example has not studied a method for determining whether the portable terminal exists in an operating area outside the vehicle compartment or a prohibiting area.

Since elements such as the vehicle body hindering the propagation of radio wave exists between the interior and exterior of the vehicle compartment, a significant difference may occur in the reception strength of a signal received by the in-vehicle communication device from the portable terminal, according to whether the portable terminal exists inside the vehicle compartment or outside the vehicle compartment. Therefore, it can be determined whether or not the portable terminal exists in the vehicle compartment through the method of the second comparative example.

However, a structure such as the body of a vehicle does not exist between the operating area outside the vehicle compartment and the prohibiting area. As described above, the high-frequency radio wave has a smaller amount of attenuation of the signal strength due to the distance as compared with the radio wave in the LF band. In other words, the signal transmitted from the portable terminal continuously attenuates outside the vehicle compartment. It may be practically difficult to determine whether the portable terminal exists in the operating area or the prohibiting area based on the reception strength.

According to an aspect of the present disclosure, a positioning system for a vehicle executes wireless communication with a portable terminal carried by a user of a vehicle by adopting a radio wave of 1 GHz or higher to determine a position of the portable terminal relative to the vehicle. The positioning system includes a vehicular exterior communication device and a positioning device. The vehicular exterior communication device includes an antenna and a strength detector. The antenna, which is disposed at a side surface portion of the vehicle, receives a wireless signal transmitted from the portable terminal. The strength detector detects reception strength of the wireless signal received by the antenna. The positioning device determines whether or not the portable terminal is present at an operating area based on vehicular exterior device strength as the reception strength of the wireless signal from the portable terminal detected by the vehicular exterior communication device, the operating area being a region outside a vehicle compartment within a predetermined operating distance from the vehicle. The vehicular exterior communication device is disposed under a door of the vehicle in a posture in which a center of directivity of the antenna faces upward or downward.

According to the above configuration, since the vehicular exterior communication device is installed in a posture in which the center of directivity faces upward or downward, a strong radio wave is not emitted in the vehicular width direction. Since the vehicular exterior communication device is installed in the above-mentioned posture below a door, the signal from the portable terminal present in the vicinity of the door can be received at a relatively high level through the signal's direct propagation or the reflection at the floor surface. It is possible to generate a meaningful difference in the reception strength observed at the vehicular exterior communication device between a situation where the portable terminal is present inside the operating area relatively closer to the vehicle and a situation where the portable terminal is present in a region relatively far from the vehicle. Therefore, it is possible to determine the position of the portable terminal outside the vehicle compartment based on the reception strength of the signal from the portable terminal. In other words, it is possible to reduce the erroneous determination of the position of the portable terminal according to the above configuration.

Since a radio wave of 1 GHz or higher has higher straightness, in a situation where the vehicular exterior communication device is installed under the door of the vehicle in a posture where the center of directivity faces upward or downward as described above, it is difficult for the strong radio wave to enter the vehicle compartment. Therefore, it is possible to generate meaningful difference in the reception strength observed by the vehicular exterior communication device between a situation where the portable terminal is present at the operating area outside the vehicle compartment and a situation where the portable is present inside the vehicle compartment. Accordingly, it is possible to determine whether the portable terminal is present in the vicinity of the door outside the vehicle compartment or in the vehicle compartment based on the reception strength of the signal sent from the portable terminal with higher precision.

(Embodimen)

The following describes an embodiment of a positioning system according to the present disclosure with reference to the drawings. FIG. 1 is a diagram showing an example of a schematic configuration of a vehicle electronic key system to which the positioning system according to the present disclosure is applied. As shown in FIG. 1, the vehicle electronic key system includes an in-vehicle system 1 equipped to a vehicle Hv and a portable terminal 2 which is a communication terminal carried by a user of the vehicle Hv.

The in-vehicle system 1 is a passive entry passive start (PEPS) system that executes predetermined vehicle control according to the position of the portable terminal 2 by executing wireless communication using a radio wave in a predetermined frequency band.

For example, the in-vehicle system 1 executes the control of door unlocking or locking based on a user's operation on a door button 13 described hereinafter, in a situation where the in-vehicle system 1 confirms whether or not the portable terminal 2 exists in an operating area Lx preliminarily set with respect to a vehicle Hv. In a situation where the in-vehicle system 1 confirms that the portable terminal 2 exists inside the vehicle compartment, the in-vehicle system 1 executes control of starting an engine, based on the user's operation on the start button 14 described hereinafter.

The operating area Lx is an area for the in-vehicle system 1 to execute predetermined vehicular control such as door locking or unlocking based on the presence of the portable terminal 2 within the area. For example, the vicinity of a door for a driver seat, the vicinity of a door for a driver's assistant seat, or the vicinity of a trunk door is set as the operating area Lx. The vicinity of the door refers to a range within a predetermined operating distance (for example, 0.7 meter) from an outer door handle. The outer door handle indicates a gripping member provided on the outer side surface of the door for opening and closing the door. As an example of the present embodiment, the region outside the vehicle compartment within a predetermined distance (for example, 0.7 meter) from the outer side door handle for the driver seat and the outer side door handle for the driver's assistant seat is set as the operating area Lx. The operating area Lx set at the right side of the vehicle is described as right area La, and the operating area Lx set at the left side of the vehicle is described as the left area Lb. The operating distance defining the magnitude of the operating area Lx may be 1 meter, or may also be 1.5 meter. The operating distance may be set to be shorter than a prohibiting distance (for example, 2 meters) defining as the magnitude of a prohibiting area described hereinafter.

Each of the in-vehicle system 1 and the portable terminal 2 in the present embodiment is configured to be capable of performing a communication (hereinafter, referred to as short range communication) with one another based on a predetermined short range wireless communication standard which has a communication range of, for example, about ten meters. In this example, as the short-range wireless communication standard, for example, Bluetooth Low Energy (Bluetooth is a registered trademark, Wi-Fi (registered trademark), ZigBee (registered trademark), or the like can be adopted. The short-range wireless communication standard may be any one that can provide a communication distance of, for example, several meters to several tens of meters. As an example, the in-vehicle system 1 and the portable terminal 2 in the present embodiment are configured to perform the wireless communication based on the Bluetooth Low Energy standard.

The portable terminal 2 is correlated with the in-vehicle system 1, and functions as an electronic key of the vehicle Hv. The portable terminal 2 is a communication device that can be carried by a user and has the short range communication function described above. For example, a smartphone can be used as the portable terminal 2. As another example, the portable terminal 2 may be a tablet terminal, a wearable device, a portable music player, a portable game device, or the like. The signal transmitted from the portable terminal 2 based on the short range communication includes transmission source information. The transmission source information is, for example, predetermined identification information (hereinafter, referred to as a terminal ID) preliminarily assigned to the portable terminal 2. The terminal ID functions as identification information of the portable terminal 2 from another communication terminal.

The portable terminal 2 wirelessly transmits a communication packet including transmission source information at a predetermined transmission interval, thereby notifying, to a surrounding communication terminal having the short range communication function, of a presence of the portable terminal 2 itself (that is, advertising). In the following description, the communication packets periodically transmitted for advice are referred to as advertisement packets.

The in-vehicle system 1 receives a signal (for example, an advertisement packet) transmitted from the portable terminal 2 by the short-range communication function described above, thereby detecting that the portable terminal 2 is present within a range in which the in-vehicle system 1 can execute a short-range communication. In the following description, a range in which the in-vehicle system 1 can mutually communicate data with the portable terminal 2 based on the short range communication function is also referred to as a communication area.

In the present embodiment, as an example, the in-vehicle system 1 is configured to detect the presence of the portable terminal 2 in the communication area by receiving the advertisement packets sequentially transmitted from the portable terminal 2, but the present disclosure is not limited to the above configuration. As another example, the in-vehicle system 1 may be configured to sequentially transmit the advertisement packet and detect the presence of the portable terminal 2 in the communication area based on an establishment of a communication connection (so-called connection) with the portable terminal 2.

(Configuration of Vehicle)

Figure 2:
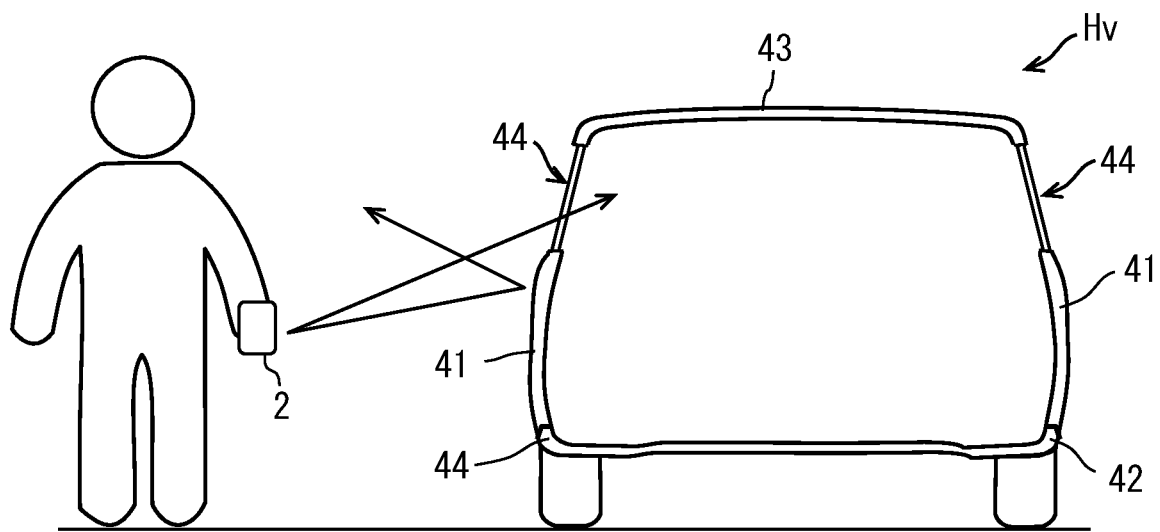
FIG. 2 is a diagram illustrating a configuration of a vehicle.

First, the configuration of the vehicle Hv will be described with reference to FIG. 2. For example, the vehicle Hv is a passenger car having a passenger capacity of five. As an example, the vehicle Hv includes a front seat and a rear seat, and a driver seat (in other words, a steering wheel) is provided on the right side. The space inside the vehicle compartment located behind a vehicle backrest portion 47 is configured as space (hereinafter referred to as a trunk area) functioning as a storage room (in other words, a trunk room). A space for the rear seat of the vehicle Hv communicates with the trunk through an upper part of a backrest portion 47 for the rear seat.

In the present specification, a part of the vehicle compartment, which is located at a front portion of a backrest 46 of the front seat is referred to as a front area. The front area also includes a vehicle interior space above an instrument panel 49. In addition, a vehicle interior space, which is located rearward of the backrest portions 46 of the front seats and forward of backrest portions 47 of the rear seats in the vehicle, is referred to as a rear area.

The vehicle Hv may have a structure other than the example described above. For example, the vehicle Hv may be a vehicle provided with the driver seat on the left side. The vehicle Hv may be a vehicle without a rear seat. In addition, the vehicle Hv may be provided with a trunk room independent of a passenger compartment of the vehicle. The vehicle may include multiple rows of rear seats. The vehicle Hv may be a motor truck such as a truck. The vehicle Hv may be a taxi or a camping vehicle.

In addition, the vehicle Hv may be a vehicle provided for a vehicle rental service (so-called rental vehicle) or a vehicle provided for a car-sharing service (so-called shared vehicle). The share car also includes a vehicle used for a service of lending a personally owned vehicle to another person during a time period when the administrator of the vehicle is not using the vehicle. In the case where the vehicle Hv is a vehicle provided with the above service (hereinafter, referred to as a service vehicle), a person who is contracting to use the service may be a user. In other words, a person who has the right to use the vehicle Hv can be a user.

Figure 8:
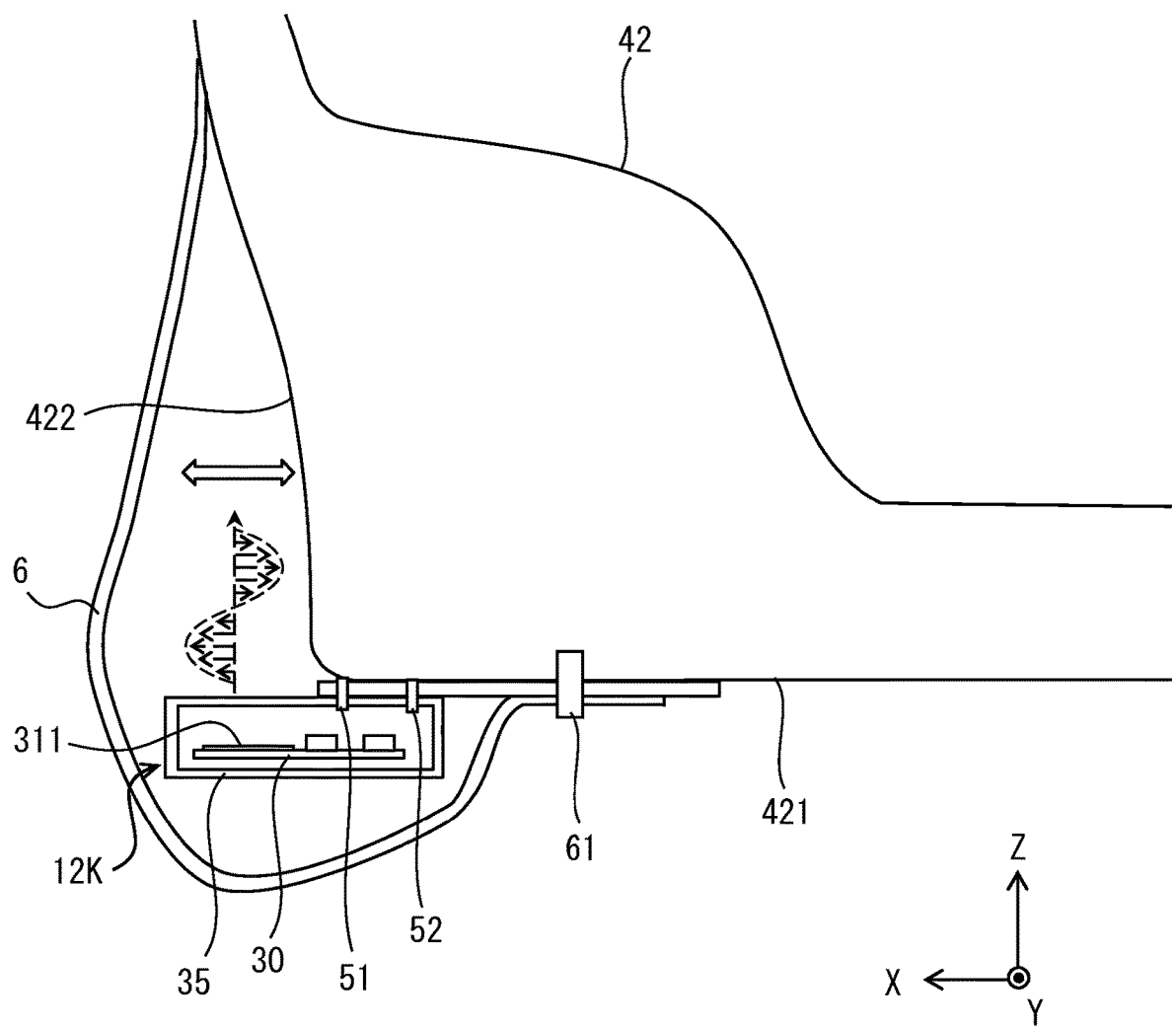
FIG. 8 is a diagram for explaining a mounting position and a mounting posture of the vehicular exterior right communication device.

The body of the vehicle includes metal members. The body described in this specification includes a frame providing a body main portion such as a side sill 42, and also includes a body panel for providing an outer shape of the vehicle Hv. The body panels include side body panels, a roof panel, a rear end panel, an engine hood panel, door panels, and the like. The side sill 42 is a frame located below the door 41, and may also be referred to as a rocker. As illustrated in FIG. 8, the side sill 42 is attached with a side sill cover 6 made of resin for protecting the side sill 42.

Since the metal plate has a property of reflecting radio waves, the body of the vehicle Hv reflects radio waves used. In other words, the vehicle Hv includes the body that blocks the linear propagation of the radio waves. In this example, the radio wave refers to a radio wave in a frequency band used for a wireless communication between the in-vehicle system 1 and the portable terminal 2. Hereinafter, the radio wave is referred to as a radio wave used for a system. The radio wave adopted by the system here refers to a radio wave in the 2.4 GHz band.

The blocking of the propagation of the radio waves described in the present specification may be referred to as ideally reflection, but may not only limited to the reflection. A configuration capable of attenuating the radio wave to a predetermined level (hereinafter, referred to as target attenuation level) or more corresponds to a configuration for blocking propagation of the radio wave. The target attenuation level may be a value at which a significant difference occurs between the signal strength of the radio wave inside the vehicle compartment and the signal strength of the radio wave outside the vehicle compartment. For example, the target attenuation level is set to 10 dB. Alternatively, the target attenuation level may be set equal to or higher than 5 dB (for example, 10 dB or 20 dB).

The vehicle Hv has a roof portion 43 provided by the roof panel, and includes multiple pillars 45 for supporting the roof panel. The multiple pillars 45 are called A pillars, B pillars, and C pillars in a stated order from a front end to a rear end. The vehicle Hv includes A pillars, B pillars, and C pillars as pillars 45. The A pillars 45A are pillars provided in front of the front seats. The B pillars 45B are pillars 45 provided between the front seats and the rear seats. The C pillars 45C are pillars 45 provided diagonally behind the rear seats.

As another example, the vehicle Hv may include D pillars 45 that are fourth pillars from the front end, and E pillars 45 that are fifth pillars from the front end. Part or all of each pillar 45 is formed of a metal member such as a high tensile strength steel plate. As another aspect, the pillar 45 may be made of carbon fiber or resin. In addition, the pillar may be made of the combination of various materials.

As described above, the vehicle Hv as a whole is configured such that, when all the doors 41 are closed, the radio wave used in the system enters the vehicle compartment from the vehicle exterior through windows 44, or leaks from the vehicle compartment to the vehicle exterior. In other words, the windows 44 are configured to act as paths for the radio wave used in the system. In this example, the windows 44 are a front window, windows provided on side surfaces of the vehicle Hv (so-called side windows), a rear window, or the like.

As another aspect, window glasses provided on doors 41 of the vehicle Hv or the like may also be configured to block the linear propagation of the radio wave used in the system. In this example, the window glasses are transparent members disposed in the windows 44 provided in the vehicle Hv, and a material of the window glasses do not have to be strictly glass. For example, the window glasses may be made of an acrylic resin or the like. In other words, the window glasses in this example are transparent members which function as a windshield.

(Configuration of In-Vehicle System)

Figure 3:
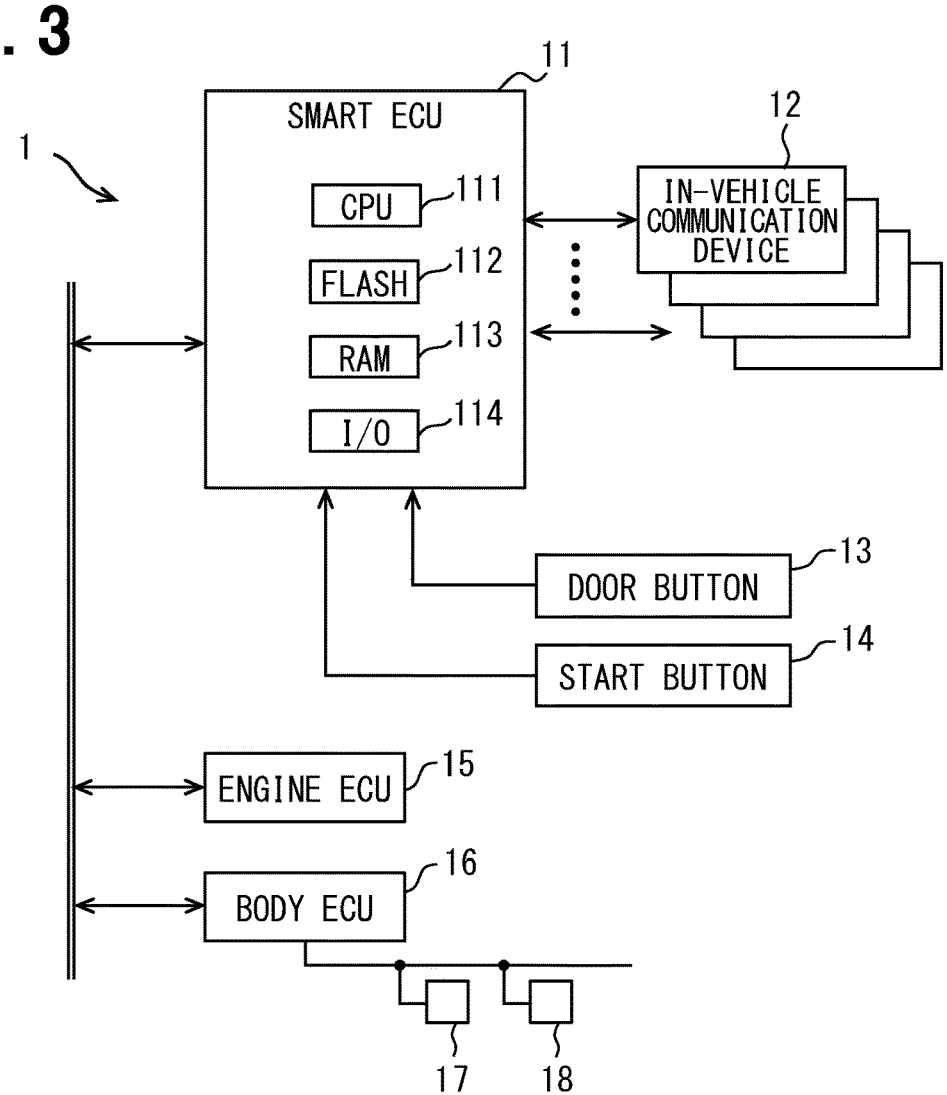
FIG. 3 is a block diagram showing a schematic configuration of an in-vehicle system.

The configuration and operation of the in-vehicle system 1 will be described. As shown in FIG. 3, the in-vehicle system 1 includes a smart ECU 11, in-vehicle communication devices 12, a door button 13, a start button 14, an engine ECU 15, and a body ECU 16. The ECUs in the member names are abbreviations of Electronic Control Unit and mean electronic control units.

The smart ECU 11 is an electronic control unit (ECU) that executes wireless communication with the portable terminal 2 as a communication terminal carried by a user to execute vehicular control for locking and unlocking the door 41, starting engine or the like. The smart ECU 11 is realized by use of a computer. In other words, the smart ECU 11 includes, for example, a CPU 111, a flash memory 112, a RAM 113, an I/O 114, and a bus line for connecting those components. The CPU 111 is an arithmetic processing unit that executes various calculation processing. The flash memory 112 is a rewritable nonvolatile storage medium. The RAM 113 is a volatile storage medium. The I/O 114 is a circuit module that functions as an interface for the smart ECU 11 to communicate with other devices mounted on the vehicle Hv, such as the data communication device 12γ. The I/O 114 may be implemented by use of an analogue circuit element, an IC, or the like.

A terminal ID assigned to the portable terminal 2 owned by the user is registered in the flash memory 112. The flash memory 112 further stores a program (hereinafter, referred to as a positioning program) for controlling a general purpose computer to function as the smart ECU 11. It should be noted that the positioning program described above may be stored in a non-transitory tangible storage medium. The execution of the positioning program by the CPU 111 corresponds to the execution of a process corresponding to the positioning program.

The flash memory 112 stores two parameters, that is, an interior equivalent value Pin and an operating threshold value Plx, as thresholds (hereinafter, referred to as determination threshold) based on which the smart ECU 11 determines whether the portable terminal 2 is present inside the vehicle compartment with reference to the reception strength of the signal transmitted from the portable terminal 2. The interior equivalent value Pin is a threshold based on which the authentication ECU determines that the portable terminal 2 is present inside the vehicle compartment. The operating threshold value Plx is a threshold value for determining whether or not the portable terminal 2 exists in the operating area Lx outside the vehicle compartment. The interior equivalent value Pin corresponds to a vehicular interior determination value. The technical significance and setting method for the interior equivalent value Pin and the operating threshold value Plx are described hereinafter.

The smart ECU 11 will be described in detail later. The smart ECU 11 may be realized by use of an MPU or a GPU instead of the CPU 111. The smart ECU 11 may be realized by a combination of the CPU 111, an MPU, and a GPU. Further, for example, some of the functions to be provided by the smart ECU 11 may be realized by using an FPGA (Field-Programmable Gate Array), an ASIC (Application Specific Integrated Circuit), or the like.

The in-vehicle communication device 12 is a communication module mounted on the vehicle Hv for executing short-range communication. Each in-vehicle communication device 12 may be connected to the smart ECU 11 through a dedicated communication line or an in-vehicle network so that each in-vehicle communication device is mutually communicable with the smart ECU 11. Each of the in-vehicle communication devices 12 is assigned with a unique communication device number. The communication device number is information corresponding to the terminal ID of the portable terminal 2. The communication device number functions as information for identifying the in-vehicle communication devices 12.

Figure 4:
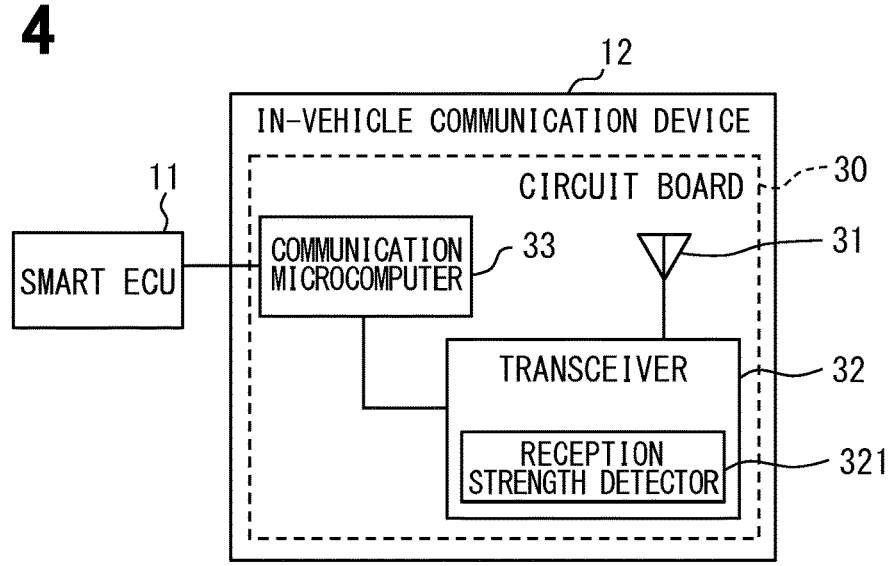
FIG. 4 is a block diagram showing a schematic configuration of an in-vehicle communication device.

FIG. 4 is a diagram schematically showing an electrical configuration of the in-vehicle communication device 12. As shown in FIG. 4, the in-vehicle communication device 12 includes a circuit board 30, an antenna 31, a transceiver 32, and a communication microcomputer 33. The circuit board 30 is, for example, a printed circuit board. Electronic components included in the in-vehicle communication device 12 are mounted on the circuit board 30.

The antenna 31 is configured to transmit and receive radio waves having a frequency band (for example, 2.4 GHz band) of the short range communication. The antenna 31 is electrically connected to the transceiver 32. As the antenna 31, a variety of antenna structures such as a patch antenna, a dipole antenna, a monopole antenna, an inverted F-antenna, an inverted L-antenna or the like may be adopted. The antenna 31 as an example is configured as a patch antenna. The transceiver 32 demodulates a signal received by the antenna 31 and outputs the demodulated signal to the communication microcomputer 33. Further, the transceiver 32 modulates the signal input from the smart ECU 11 through the communication microcomputer 33, and outputs the modulated signal to the antenna 31, and radiates the output signal as a radio wave. The transceiver 32 is connected to the communication microcomputer 33 in a mutually communicable manner.

In addition, the transceiver 32 includes a reception strength detector 321 that sequentially detects the strength of the signal received by the antenna 31. The reception strength detector 321 can be implemented by various circuit configurations. The reception strength detected by the reception strength detector 321 is sequentially provided to the communication microcomputer 33 in association with the terminal ID included in the reception data. The reception strength may be expressed by, for example, a unit [dBm] of power. For convenience, data in which the reception strength and the terminal ID are associated with each other is referred to as reception strength data. The reception strength detector 321 corresponds to a strength detector.

The communication microcomputer 33 is a microcomputer for controlling the transfer of data with the smart ECU 11. The communication microcomputer 33 provides the reception data input from the transceiver 32 to the smart ECU 11 sequentially or based on a request from the smart ECU 11. In other words, the data received by the transceiver 32 is provided to the smart ECU 11 through the communication microcomputer 33.

The communication microcomputer 33 also has a function of authenticating the terminal ID of the portable terminal 2, and performing a cryptographic communication with the portable terminal 2 on the basis of a request from the smart ECU 11. As an encryption method, various methods such as a method specified by Bluetooth can be used. Various methods, such as the method specified in Bluetooth, can also be used for the ID-authentication method.

In addition, when the communication microcomputer 33 acquires the reception strength data from the reception strength detector 321, the communication microcomputer 33 accumulates the reception strength data in a RAM (not shown). The reception strength data sequentially acquired may be sorted in chronological order and stored in the RAM so that the reception strength of the latest reception data becomes a head, for example. The data that has been stored before a certain period of time may be sequentially discarded. In other words, the reception strength data is held in the RAM of the communication microcomputer 33 for a predetermined time. The communication microcomputer 33 provides the reception strength data stored in the RAM based on a request from the smart ECU 11. The reception strength data provided to the smart ECU 11 may be deleted from the RAM. In the present embodiment, the communication microcomputer 33 provides reception strength date stored in a built-in RAM to the smart ECU 11 based on the demand from the smart ECU 11. The communication microcomputer 33 may sequentially provide to the smart ECU 11. The installation, particular configuration, function and operation of each in-vehicle communication device 12 are described hereinafter.

The door button 13 is a button for the user to unlock and lock the door 41 of the vehicle Hv. The door button 13 may be provided in each door handle of the vehicle Hv. When the user presses the door button 13, the door button 13 outputs an electrical signal indicative of the instruction to the smart ECU 11. The door button 13 corresponds to a configuration in which the smart ECU 11 receives a user's instruction of locking and unlocking. A touch sensor may be employed as a configuration for receiving at least one of the unlocking instruction and the locking instruction from the user. The touch sensor is a device that detects that the user is touching the door handle.

The start button 14 is a push switch for the user to start a driving source (for example, an engine). When the user performs a push operation on the start button 14, the start button 14 outputs an electrical signal indicating the push operation to the smart ECU 11. As an example, the vehicle Hv is a vehicle provided with an engine as a power source, but the present disclosure is not limited to the above example. The vehicle Hv may be an electric vehicle or a hybrid vehicle. When the vehicle Hv is a vehicle provided with a motor as a driving source, the start button 14 is a switch for starting the motor for driving.

The engine ECU 15 is an ECU for controlling the operation of an engine mounted on the vehicle Hv. For example, when the engine ECU 15 acquires a start instruction signal that instructs starting of the engine from the smart ECU 11, the engine ECU 15 starts the engine.

The body ECU 16 is an ECU configured to control in-vehicle actuator 17 in response to a request from the smart ECU 11. The body ECU 16 is communicably connected to various in-vehicle actuators 17 and various in-vehicle sensors 18. In this example, the in-vehicle actuators 17 include, for example, a door lock motor configuring a locking mechanism of each door 41, an actuator for adjusting a seat position (hereinafter, referred to as a seat actuator), and the like. The in-vehicle sensors 18 in this example are a courtesy switch and the like disposed for each door 41. The courtesy switches are sensors for detecting opening and closing of the door 41. The body ECU 16, for example, outputs a predetermined control signal to the door lock motors provided on the respective doors of the vehicles Hv based on a request from the smart ECU 11, thereby locking and unlocking the doors 41 of the vehicles Hv.

(Function and Configuration of Each In-Vehicle Communication Device)

Figure 5:
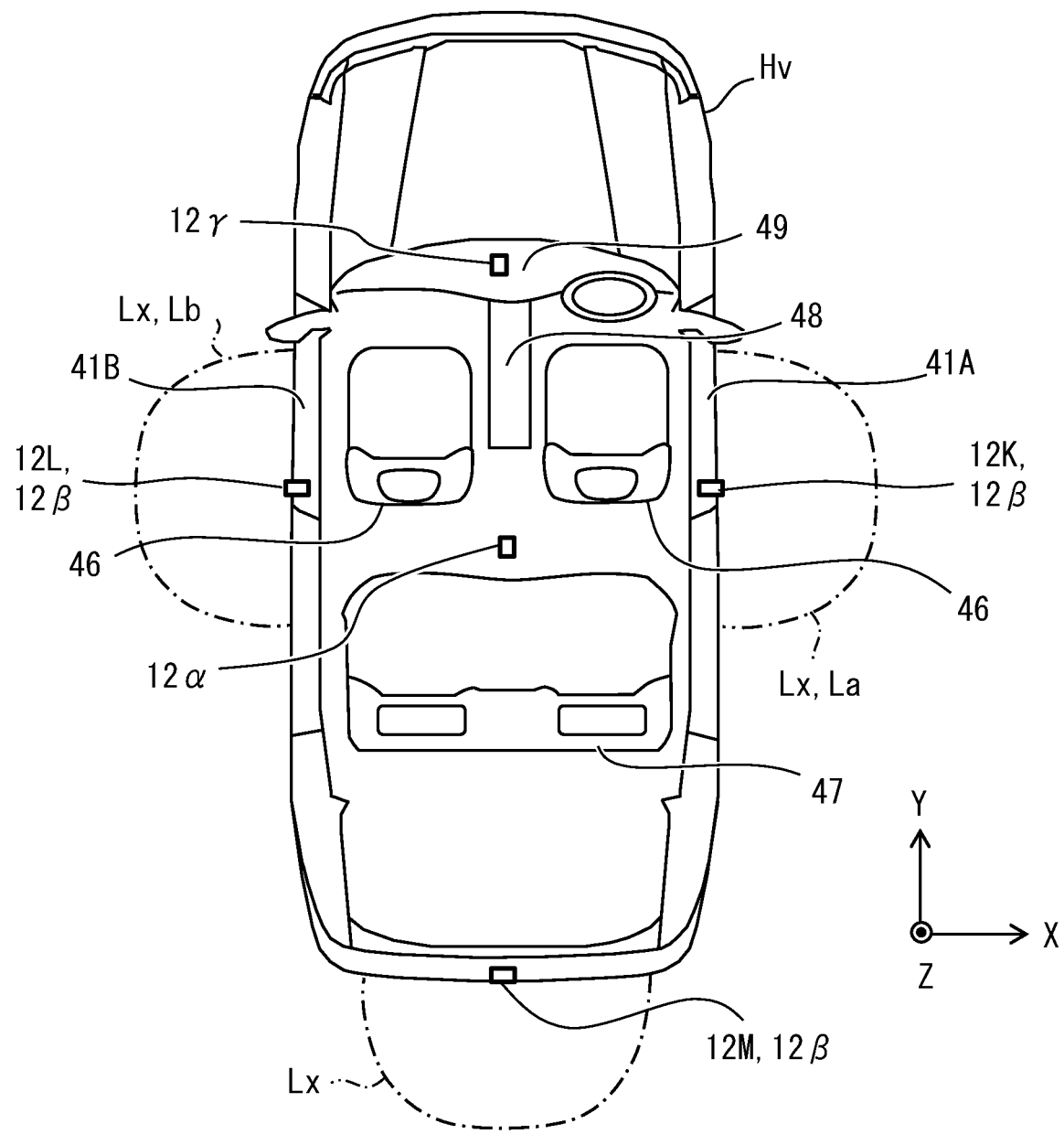
FIG. 5 is a diagram conceptually showing an example of a mounting position of the in-vehicle communication device.
Figure 6:
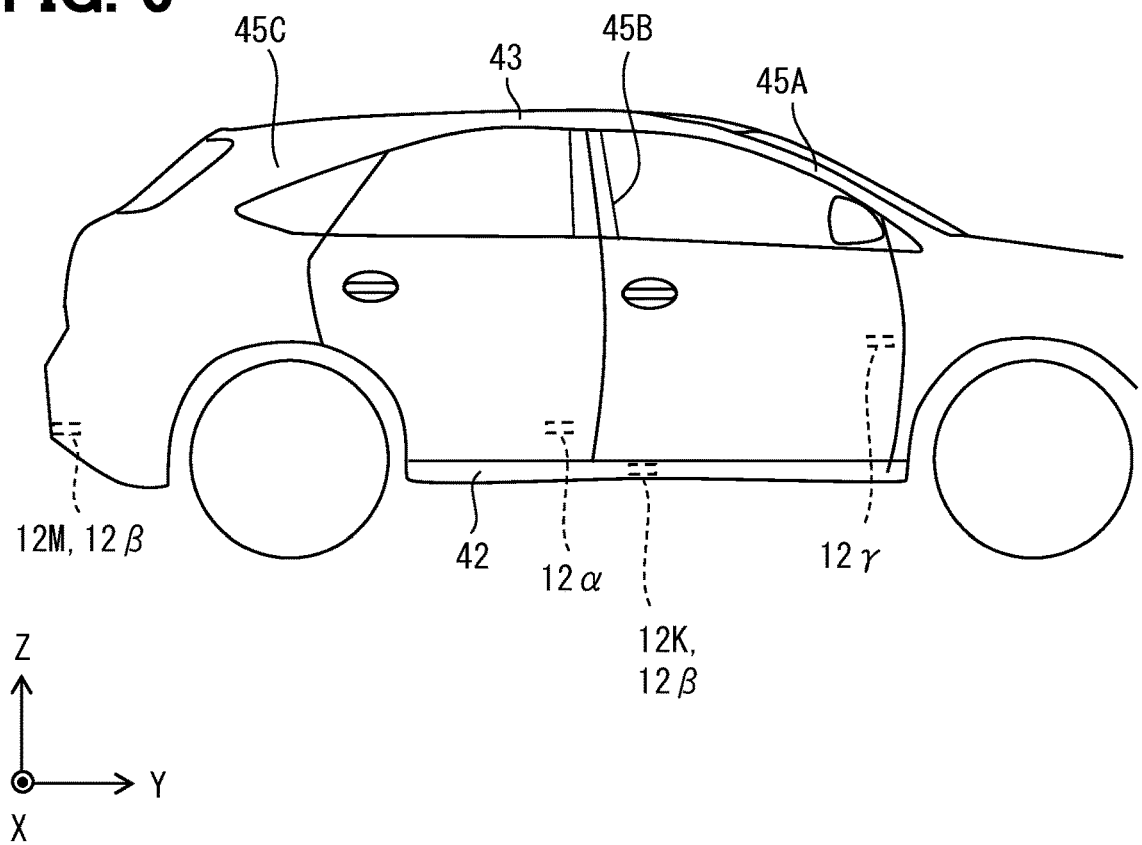
FIG. 6 is a conceptual side view of the vehicle illustrating a mounting position of the in-vehicle communication device.

As shown in FIGS. 5 and 6, the in-vehicle system 1, as the in-vehicle communication device 12, includes a vehicular interior communication device 12α, vehicular exterior right communication device 12K, a vehicular exterior left communication device 12L, a compartment vehicular exterior rear communication device 12M and a data communication device 12γ. The data communication device 12γ transmits data to or receives data from the portable terminal 2 by the smart ECU 11. The vehicular interior communication device 12α, the vehicular exterior right communication device 12K, and the compartment vehicular exterior rear communication device 12M are the in-vehicle communication device 12 for providing the reception strength of a signal transmitted from the portable terminal 2 to the smart ECU 11. FIG. 5 is a conceptual top view of the vehicle Hv, and shows a roof portion 43 in a transparent manner in order to describe the installation positions of various vehicular interior communication devices 12.

The vehicular interior communication device 12α is the in-vehicle communication device 12 for setting a region inside the vehicle compartment as a strong electric field area. The strong electric field area is an area in which a signal transmitted from the in-vehicle communication device 12 propagates while maintaining a strength equal to or higher than a predetermined threshold (hereinafter, referred to as a strong electric field threshold). The strong electric field threshold is set to a sufficiently strong level as a signal for the short-range communication. For example, the strong electric field threshold is −35 dBm (−0.316 μW). Since the propagation path of the radio signal is reversible, according to another aspect, the strong electric field area is also an area in which the reception strength of the signal, which is transmitted from the portable terminal 2 and received by the in-vehicle communication device 12, is equal to or higher than the strong electric field threshold.

The vehicular interior communication device 12α is buried in the center of a floor between a front seat and a rear seat in a vehicular width direction. The installation position of the vehicular interior communication device 12α can be changed as appropriate. The vehicular interior communication device 12α may be arranged at a center console 48 or a floor portion of a trunk area, or may also be arranged at a surface portion of a door 41 of the driver seat inside the vehicle compartment.

The number of the in-vehicle communication devices 12 arranged inside the vehicle compartment may be modified as appropriate. In other words, the number of the in-vehicle communication devices 12α may be more than one. For example, the number of the in-vehicle communication devices 12α may be two or three. The number of in-vehicle communication devices 12 may also be four or more. For example, two vehicular interior communication devices 12α may be respectively provided as the in-vehicle communication device 12 arranged near a foot position of the driver seat and the in-vehicle communication device 12 arranged at the floor portion of the trunk area. The vehicular interior communication devices 12α may be provided one respectively at the side surfaces of left and right B-pillars 45B inside the compartment. In addition, the vehicular interior communication device 12α may be provided at the side surface of the door 41 for the rear seat or the floor surface of the rear seat.

The vehicular interior communication device 12α is preferably disposed at a position where the outside of the vehicle compartment becomes the area beyond the viewable range of the vehicular interior communication device 12α. The viewable range from the position of the in-vehicle communication device 12 refers to an area in which a signal transmitted from the in-vehicle communication device 12 can directly reach. Since the propagation path of the radio signal is reversible, the viewable range of the in-vehicle communication device 12 also refers to an area in which the in-vehicle communication device 12 can directly receive the signal transmitted from the portable terminal 2. An area beyond the viewable range of the in-vehicle communication device 12 is an area in which the signal transmitted from the in-vehicle communication device 12 cannot directly reach. Since the propagation path of the radio signal is reversible, the area beyond the viewable range of the in-vehicle communication device 12 also refers to an area in which the in-vehicle communication device 12 cannot directly receive the signal transmitted from the portable terminal 2. The signal transmitted from the portable terminal 2 can reach the area beyond the viewable range by reflection on various structures.

The vehicular exterior right communication device 12K is the in-vehicle communication device 12 for setting a right area La as a strong electric field area. The right area La, in other words, is around the door 41 of the front seat provided at the right side of the vehicle Hv (hereinafter referred to as front right door 41A). In this example, since the driver seat is disposed on the right side of the vehicle Hv, the front right door 41A corresponds to the driver seat door.

As shown in FIG. 6, the vehicular exterior right communication device 12K is attached to a portion of a side sill 42 located below the outer door handle of the front right door 41A. The vehicular exterior right communication device 12K is disposed in a posture so that the center of the directivity faces upward at the above-mentioned mounting position and the direction of electric field vibration (the so-called plane of polarization) is perpendicular to the door panel. The perpendicular may not be limited to a situation of exactly perpendicular, and may be tilted by about 30°. That is, perpendicular may also include a situation of substantially perpendicular. Similarly, postures such as parallel and opposite also include a state of being tilted by about 30°. The posture of the center of directivity facing the above of the vehicle is not limited to a posture of the center of directivity completely faces the above of the vehicle. The posture that the center of directivity faces the above of the vehicle includes a configuration in which the center of directivity faces upward by 45° or larger with respect to vehicular horizontal plane. In a situation where the door 41 is made of resin, the vehicular exterior right communication device 12K may be attached to a portion of the side sill 42 located below the B-pillar 45B.

Figure 7:
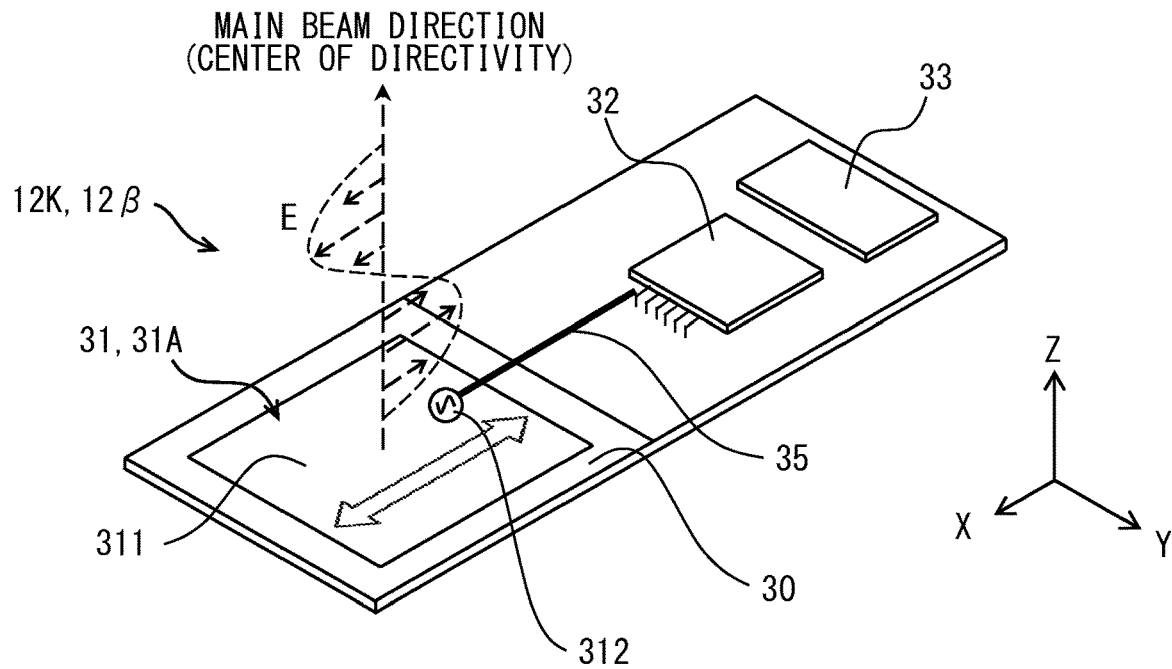
FIG. 7 is a diagram showing an example of an internal configuration of a vehicular exterior right communication device and a vehicular exterior left communication device.

The vehicular exterior right communication device 12K in the present embodiment includes a configuration in which a patch antenna 31A as the antenna 31 is formed at an end of a rectangular circuit board 30 in a longitudinal direction, as shown in FIG. 7. In other words, the antenna 31 includes a radiation element 311 being a flat conductor, a feeding point 312 and a ground pattern (not shown). For simplicity in the following, a concept of a three-dimensional coordinate system provided with X, Y, and Z axes which are perpendicular to each other are appropriately introduced to describe the configuration and the installation posture of the vehicular exterior right communication device 12K. The X-axis is parallel to the vehicular width direction. The right side of the vehicle represents a positive direction of the X-axis. The Y-axis is parallel to the vehicular front-rear direction. The front side of the vehicle represents a positive direction of the Y-axis. The Z-axis is parallel to the vehicular height direction. The above of the vehicle represents a positive direction of the Z-axis.

The ground pattern included in the patch antenna 31A is a plate conducting member arranged to face the radiation element 311 for supplying a ground potential. A thin film may also be a plate. The ground pattern is formed at the rear surface or inner layer portion of the circuit board 30. The radiation element 311 has a rectangular shape. The length of the radiation element 311 in the X-axis direction is electrically set to half the wavelength of the radio wave used by the system. The electrical length described herein is an effective length taking into consideration a fringing electric field and a wavelength shortening effect by a dielectric. For example, the half wavelength of the radio wave used in the system is about 62 mm in vacuum. However, in this situation, the length of the radiation element 311 in the X-axis direction is set to about 30 mm due to the wavelength shortening effect provided by the circuit board 30. The length in the Y-axis direction may be appropriately designed. For example, the length in the Y-axis direction is set to, for example, a length identical to the length in the X-axis direction. The feeding points 312 are arranged in a straight line parallel to the X-axis through the center of the radiating element 311. The feeding point 312 is connected to the transceiver 32 through a feeding line 34.

The patch antenna 31A has a current flowing in the X-axis direction (in other words, the plane of polarization is perpendicular to an YZ plane). The white line arrows respectively shown in FIG. 7 and FIG. 8 represent vibration direction of electric field in a radiating radio wave. Each member included in the vehicular exterior right communication device 12K is attached to the vehicle Hv such that each member is stored in a housing 35 as a case for waterproofness. The vehicular exterior right communication device 12K is fixed to a bottom portion 421 (in other words, a bottom end portion) of the side sill 42 through a bracket 5 as shown in FIG. 8. The vehicular exterior right communication device 12K is attached such that a portion or the whole portion of the patch antenna 31A protrudes to the right side (in other words, X-axis position direction) of the vehicle from the side surface portion of the side sill 42 (hereinafter referred to as side sill side-surface portion).

The bracket 5 is a metal plate member having a configuration for fixing the vehicular exterior right communication device 12K to the bottom surface portion 421 of the side sill 42. The vehicular exterior right communication device 12K is fixed to the lower surface portion of the bracket 5 by fasteners 51, 52. The bracket 5 does not interfere the transmission or reception of a radio wave emitted by the patch antenna 31A. The bracket 5 is fixed to the housing 35 so as not to cover the patch antenna 31A from above. Fasteners 51 and 52 are, for example, screws. As the configuration for fixing the vehicular exterior right communication device 12K to the bracket 5, a variety of configuration such as snap fit can be adopted in addition to screwing. The bracket 5 is fixed to a side sill cover 6 and the side sill 42 through the fastener 61.

The side sill cover 6 made of resin protects the side sill 42. The side sill cover 6 is attached to the side sill 42 to enclose the vehicular exterior right communication device 12K. In other words, the vehicular exterior right communication device 12K is attached to an inner side of the side sill cover 6. The side sill cover 6 is locked to the bracket 5 and the bottom surface portion 421 of the side sill 42 through the fastener 61. The side sill cover 6 may also be made of carbon. A member for allowing a radio wave to pass through may be adopted for the side sill cover 6.

The fasteners 51, 52 for fixing the vehicular exterior right communication device 12K to the bracket 5 may be used with the fastener 61 for fixing the side sill cover 6 to the side sill 42. The fastener for fixing the bracket 5 to the side sill 42 and the fastener for fixing the side sill cover 6 to the side sill 42 may be provided separately. The configuration for fixing each member may be modified as appropriate. A variety of configurations may be adopted.

Figure 9:
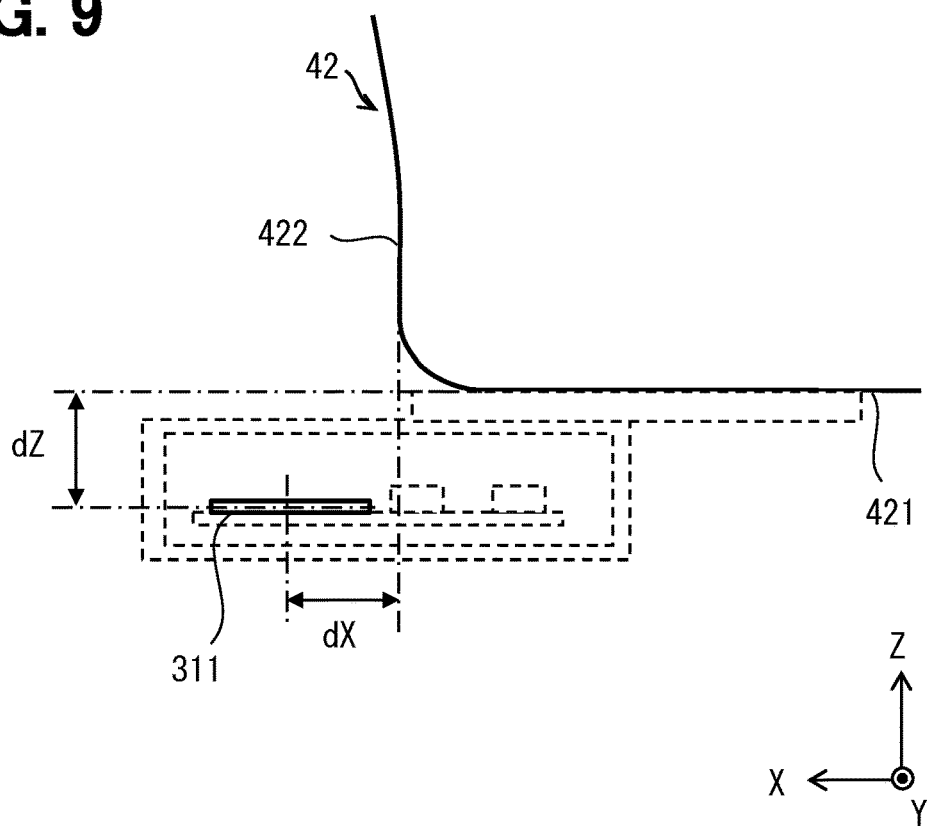
FIG. 9 is a diagram for explaining a mounting position and a mounting posture of the vehicular exterior right communication device.

FIG. 9 is an enlarged view of the periphery of the radiating element 311 shown in FIG. 8. The protruding amount dX as the distance between the side-sill surface portion 422 and the center of the radiating element 311 in the X-axis direction is set to, for example, 20 millimeters. The separation distance dZ between the bottom surface portion 421 and the radiating element 311 in the height direction is set to 36 millimeters. dZ is a parameter (hereinafter referred to as a relative height position) that indicates a position of the radiating element 311 relative to the bottom surface portion 421 in the height direction. The vehicular exterior right communication device 12K may be mounted in such a manner that the patch antenna 31A is not completely electromagnetically shielded by, for example, the side sill 42. In essence, at least one portion of the radiating element 311 may be attached to protrude to the right side of the vehicle from the side-sill side surface portion 422.

Figure 10:
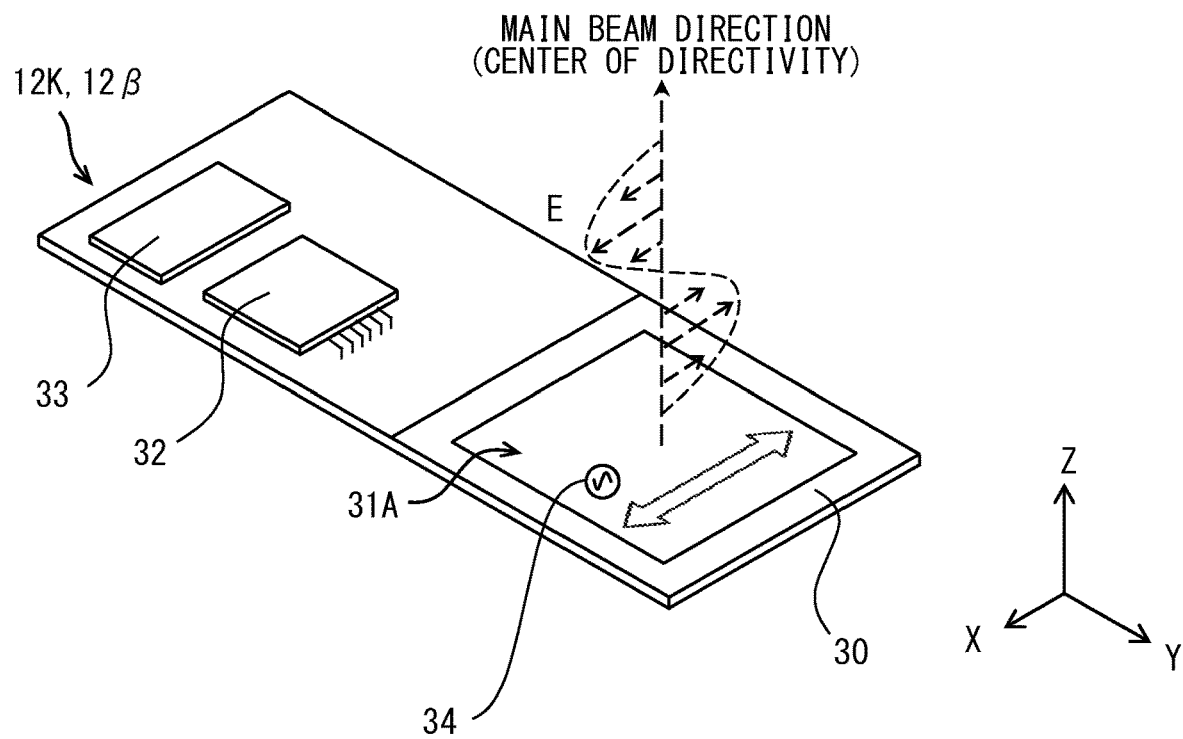
FIG. 10 illustrates an example of an internal configuration of a vehicular exterior right communication device and a vehicular exterior left communication device.

The arrangement of the parts inside the housing 35 and the installation of the vehicular exterior right communication device 12K to the side sill 42 may be appropriately modified. For example, as another aspect, the vehicular exterior right communication device 12K may have a configuration in which electronic components are arranged side by side in the Y-axis direction with respect to the patch antenna 31A as shown in FIG. 10. The patch antenna 31A has a current flowing in the X-axis direction (in other words, the plane of polarization is perpendicular to an YZ plane).

The vehicular exterior right communication device 12K having the above configuration is attached to the bottom surface portion 421 of the side sill 42 by adopting the bracket 5. The vehicular exterior right communication device 12K may be attached such that the patch antenna 31A protrudes from the side-sill side surface portion 422 to the right side of the vehicle (in other words, the positive X-direction) and the longitudinal direction is along the Y-axis. The vehicular exterior right communication device 12K is fixed to the upper surface of the bracket 5.

Figure 11:
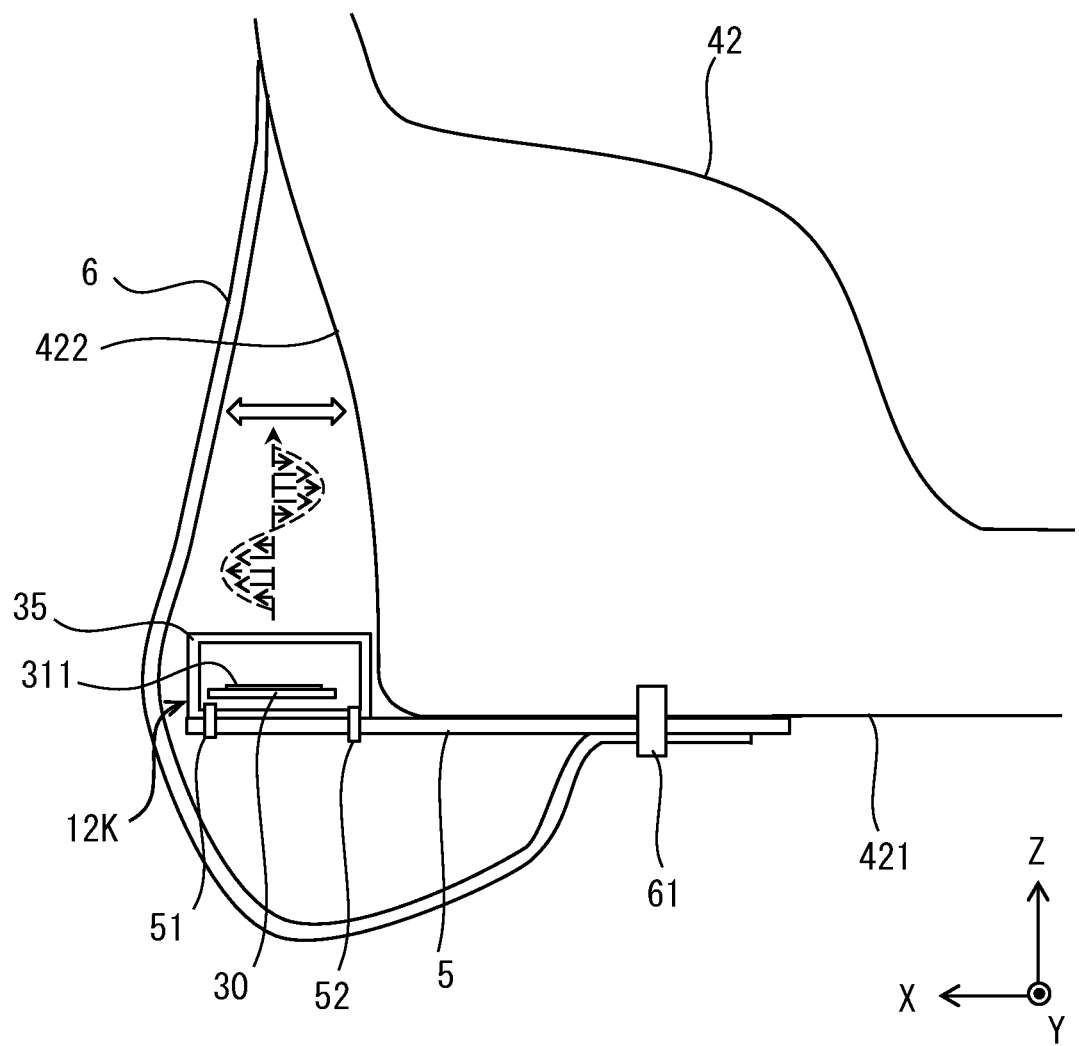
FIG. 11 is a diagram for explaining a mounting position and a mounting posture of the vehicular exterior right communication device.

In the configuration in which the bracket 5 is attached to the lower side of the vehicular exterior right communication device 12K as shown in FIG. 11, the bracket 5 may be extended to the lower side of the radiating element 311. According to the aspect of forming such a bracket 5, it is possible to set the directivity of the patch antenna 31A further upward since the bracket 5 functions as a ground plate and/or reflector for the radiating element 311. The mounting position shown in FIG. 11 can be understood as the side of the side sill 42. The vehicular exterior right communication device 12K may be attached to the bottom surface portion 421 or the side-sill side surface portion 422 of the side sill 42.

The vehicular exterior left communication device 12L is the in-vehicle communication device 12 for setting a left area Lb as a strong electric field area. The left area Lb, in other words, is around the door 41 of the front seat provided at the left side of the vehicle Hv (hereinafter referred to as front left door 41A). In this example, since the driver seat is disposed on the right side of the vehicle Hv, the front left door 41B corresponds to a door for the assistant driver seat.

The vehicular exterior left communication device 12L at the left surface portion of the vehicle Hv is disposed at a position opposite to the vehicular exterior right communication device 12K. The vehicular exterior left communication device 12L corresponds an in-vehicle communication device 12 paired with the vehicular exterior right communication device 12K. The vehicular left communication device 12L is disposed at the bottom surface portion 421 of the side sill 42 located below the left door 41B such that the center of directivity faces the above of the vehicle and the plane of polarization is perpendicular to the door panel. Since the configuration of the vehicular exterior right communication device 12K may be adopted as the inner configuration of the vehicular left communication device 12L, the description for the configuration of the vehicular left communication device 12L is omitted.

The vehicular exterior rear communication device 12M is the in-vehicle communication device 12 for a strong electric field in the vicinity of the trunk door. The vehicular exterior rear communication device 12M is disposed at a central portion of the rear end portion of the vehicle in the vehicular width direction. For example, the vehicular exterior rear communication device 12M may be disposed at a position such as the door handle for the trunk, near the license plate and inside or the lower end portion of the rear bumper. For example, the vehicular exterior rear communication device 12M is disposed at the bottom portion of the rear bumper in a posture such that the center of directivity faces the above of the vehicle (in other words, in the positive Z-axis direction) and the plane of polarization is perpendicular to the XZ plane. A part or the entire part of the patch antenna 31A is attached so as to protrude from the rear end surface to the rear side of the vehicle so that the center of directivity (the so-called main lobe) of the patch antenna 31A is not shielded by a metal body such as a body. Since the configuration of the vehicular exterior right communication device 12K may be adopted as the inner configuration of the vehicular exterior rear communication device 12M, the description for the configuration of the vehicular exterior rear communication device 12M is omitted.

The data communication device 12γ is provided by the in-vehicle communication device 12 which has already executed a key exchange protocol (known as pairing) with the portable terminal 2 in response to an operation made by the user or the like. Information about the portable terminal 2 acquired by pairing (hereinafter, referred to as terminal information) is stored in a non-volatile memory included in the communication microcomputer 33. The terminal information includes, for example, a key exchanged by pairing, a terminal ID, or the like. Storage of the exchanged keys is also referred to as bonding. In a case where the vehicle Hv is used by multiple users, the terminal information of the portable terminal 2 carried by each user is stored in the communication microcomputer 33.

When the data communication device 12γ receives the advertisement packet from the portable terminal 2, the data communication device 12γ automatically establishes a communication connection with the portable terminal 2 by use of the storage terminal information. Then, the smart ECU 11 transmits and receives data to/from the portable terminal 2. When establishing the communication connection with the portable terminal 2, the data communication device 12γ provides the terminal ID of the portable terminal 2 which is in a communication connection to the smart ECU 11.

According to the Bluetooth standard, an encrypted data communication is performed by a frequency hopping method. The frequency hopping method is a communication system in which channels to be used for a communication are successively switched to another with time. Specifically, in the Bluetooth standard, the data communication is performed by a frequency hopping spread spectrum method (FHSS: Frequency Hopping Spread Spectrum). In the Bluetooth Low Energy (hereinafter, referred to as Bluetooth LE), 40 channels from No. 0 to No. 39 are prepared, and 37 channels from No. 0 to No. 36 are available for a data communication. The three channels from No. 37 to No. 39 are used for transmission of the advertisement packets.

In a state where the communication connection with the portable terminal 2 is established, the data communication device 12γ performs transmission and reception of data with the portable terminal 2 while sequentially changing 37 channels. At that time, the data communication device 12γ sequentially provides information indicating a channel used for a communication with the portable terminal 2 (hereinafter, referred to as channel information) to the smart ECU 11. The channel information may be a specific channel number, or may be a parameter (so-called Hop Increment) indicating a transition rule of a used channel. The Hop Increment is a number from 5 to 16 that is randomly determined during the communication connection. The channel information preferably includes a present channel number and a Hop Increment.

The data communication device 12γ is disposed at, for example, a central portion of the instrument panel 49 in the vehicular width direction. It may be preferable that the data communication device 12γ is disposed at a position where the vicinity of the door at the interior of the vehicle compartment and the exterior of the vehicle compartment can come in sight. The position at which the vicinity of the door in the vehicle interior and the vehicle exterior can come in sight is, for example, a ceiling portion in the vehicle compartment. Therefore, the data communication device 12γ may be disposed at an overhead console or the central portion of the ceiling. Even in a situation where the portable terminal 2 is present out of sight of the data communication device 12γ, the wireless communication can be executed between the portable terminal 2 and the data communication device 12γ through, for example reflection at a structure. Therefore, the data communication device 12γ may also be disposed at a position where the exterior of the vehicle compartment is out of sight such as the center console 48 or the foot position or floor portion of the driver seat.

The in-vehicle communication device 12 disposed at the outer surface portion of the vehicle Hv such as the vehicular exterior right communication device 12K, the vehicular left communication device 12L or the vehicular exterior rear communication device 12M can be described as the vehicular exterior communication device 12β. In the present disclosure, the outer surface portion is a body portion which is in contact with a vehicle exterior space of the vehicle Hv, and includes a side surface, a rear surface, and a front surface of the vehicle Hv. With regard to the vehicular exterior communication device 12β, the in-vehicle communication device 12 disposed at the left side surface portion and the right side surface portion such as the vehicular exterior right communication device 12K and the vehicular left communication device 12L may also be referred to as a side communication device. The number of vehicle exterior communication devices 12β included in the in-vehicle system 1 can be properly changed. The number of vehicle exterior communication devices 12β may be two, three, or four. The number of vehicle exterior communication devices 12β included in the in-vehicle system 1 may be five or more.

Both the vehicular interior communication device 12α and the vehicle exterior communication device 12β are configured to mainly report the reception strength of the signal from the portable terminal 2 to the smart ECU 11. Therefore, hereinafter, various types of the vehicular interior communication device 12α and the vehicle exterior communication device 12β are also referred to as strength observation devices. The respective strength observation devices provide the reception strength of the signals transmitted from the portable terminal 2 to the smart ECU 11. As described above, part or all of the strength observation devices may play a role as the data communication device 12γ. In other words, the data communication device 12γ may also be a strength observation device. For example, the data communication device 12γ may be disposed at the center console 48 and may function as the interior communication device 12α.

(Function of Smart ECU)

Figure 12:
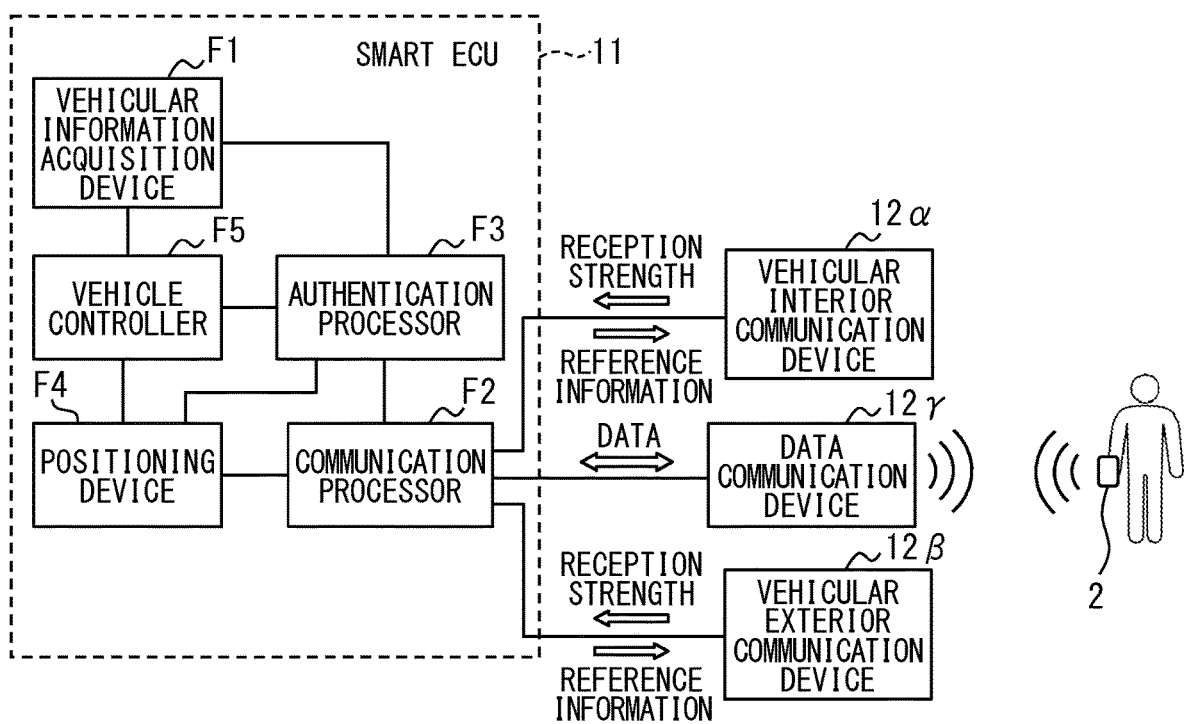
FIG. 12 is a diagram illustrating the function of the smart ECU.

The smart ECU 11 executes the positioning programs described above to provide functions corresponding to various functional blocks shown in FIG. 12. In other words, the smart ECU 11 includes, as functional blocks, a vehicle information acquisition device F1, a communication processor F2, an authentication processor F3, a positioning device F4, and a vehicle controller F5.

The vehicle information acquisition device F1 acquires various pieces of information indicating the state of the vehicle Hv (hereinafter, referred to as vehicle information) from sensors, ECUs (for example, body ECU 16), switches, and the like mounted on the vehicle Hv. The vehicle information includes, for example, an open/closed state of the door, a locked/unlocked state of each door, whether or not the door button 13 is pressed, whether or not the start button 14 is pressed, and the like. In addition, the vehicle information acquisition device F1 specifies a present state of the vehicle Hv based on the various information described above. For example, when the engine is off and all the doors 41 are locked, the vehicle information acquisition device F1 determines that the vehicle Hv is parked. It is needless to say that the condition for determining that the vehicle Hv is parked may be designed as appropriate, and various determination conditions and the like can be applied.

The acquisition of the information indicating the locked/unlocked state of each door 41 corresponds to the determination of the locked/unlocked state of each door 41 and the detection of the locking operation/unlocking operation of the door 41 by the user. Also, the acquisition of electric signals from the door button 13 and the start button 14 corresponds to detection of the user operation on those buttons. In other words, the vehicle information acquisition device F1 corresponds to a configuration for detecting the user's operation on the vehicle Hv, such as opening and closing of the door 41, pressing of the door button 13, pressing of the start button 14, and the like. The vehicle information described hereinafter includes the user operation on the vehicle Hv.

The types of information included in the vehicle information are not limited to those described above. The vehicle information also includes a shift position detected by a shift position sensor (not shown), a detection result of a brake sensor for detecting whether or not a brake pedal is depressed, and the like. The operation state of the parking brake can also be included in the vehicle information.

The communication processor F2 is configured to perform transmission and reception of data to and from the portable terminal 2 in cooperation with the data communication device 12. For example, the communication processor F2 generates data addressed to the portable terminal 2, and outputs the data to the data communication device 12γ. As a result, the communication processor F2 transmits a signal corresponding to desired data as a radio wave. In addition, the communication processor F2 receives data from the portable terminal 2 received by the data communication device 12γ. In the present embodiment, the wireless communication between the smart ECU 11 and the portable terminal 2 is configured to be executed in an encrypted manner. The smart ECU 11 as the communication processor F2 acquires channel information from the data communication device 12γ. As a result, the smart ECU 11 specifies a channel used by the data communication device 12γ for a communication with the portable terminal 2.

The smart ECU 11 acquires the terminal ID of the portable terminal 2 to which the data communication device 12γ is communicatively connected from the data communication device 12γ. According to the configuration described above, even in the vehicle in which the vehicle Hv is shared by multiple users, the smart ECU 11 can specify a user who is present in the vicinity of the vehicle Hv based on the terminal ID of the portable terminal 2 to which the data communication device 12γ is communicatively connected.

In addition, the communication processor F2 distributes the channel information and the terminal ID acquired from the data communication device 12γ to each of the strength observation devices as reference information. The channel information shown in the reference information enables each strength observation device to recognize the channel to be received among the many channels included in the Bluetooth standard in order to receive the signal from the portable terminal 2. In addition, even when the strength observation device receives signals from the multiple devices, the strength observation device can specify which device should report the reception strength of the signal to the smart ECU 11, based on the terminal ID indicated in the reference information.

The authentication processor F3 performs a process of authenticating the portable terminal 2 in cooperation with the data communication device 12γ (hereinafter, referred to as an authentication process). The short-range communication for authentication is performed after being encrypted by the data communication device 12γ. In other words, the authentication process is performed by a cryptographic communication. The authentication process itself may be performed by use of various methods such as a challenge-response method. A detailed description of the authentication process will be omitted in this example. It is assumed that data (for example, encryption key) required for the authentication process is stored in each of the portable terminal 2 and the smart ECU 11.

A timing at which the authentication processor F3 performs the authentication process may be, for example, a timing at which the communication connection between the data communication device 12γ and the portable terminal 2 is established. The authentication processor F3 may be configured to perform the authentication process at a predetermined cycle while the data communication device 12 and the portable terminal 2 are in communication connection. Further, the authentication processor F3 may be configured such that a cryptographic communication for the authentication process is performed by using a predetermined user operation on the vehicle Hv as a trigger, for example, when the start button 14 is pressed by the user.

In the present embodiment, the smart ECU 11 and the portable terminal 2 are configured to encrypt and execute a data communication for authentication or the like in order to improve security, but the present disclosure is not limited to the above configuration. As another aspect, the smart ECU 11 and the portable terminal 2 may be configured to perform a data communication for authentication or the like without encrypting the data communication.

In the Bluetooth standard, the communication connection between the data communication device 12γ and the portable terminal 2 is established means that a communication partner of the data communication device 12γ is the portable terminal 2 registered in advance. Therefore, the smart ECU 11 may be configured to determine that the portable terminal 2 has been successfully authenticated based on the condition that the communication connection between the data communication device 12γ and the portable terminal 2 has been established. The positioning device F4 is configured to determine whether or not the portable terminal 2 is present in the vehicle compartment based on the reception strength of the signal from the portable terminal 2 provided from each of the multiple strength observation devices. The positioning device F4, in particular, determines whether the portable terminal 2 exists in the vehicle compartment, in the operating area Lx or outside the area based on the reception status of the response signal from the portable terminal 2. The term "outside the area" refers to a region of an area outside the vehicle compartment area as a region outside the operating area Lx. A region outside the area that is at least a predetermined prohibited distance from the outer door handle may be referred to as a prohibiting area. The prohibited distance is set to 2 meters from the viewpoint of theft prevention described hereinafter. Since the portable terminal 2 is basically carried by the user, the determination of the position of the portable terminal 2 corresponds to the determination of the position of the user. The prohibited distance may be, for example, 1.6 meters or 3 meters. The prohibited distance, which defines the magnitude of the prohibiting area, may be appropriately modified according to, for example, a region where the vehicle is used.

As a preparatory process for determining the position of the portable terminal 2, the positioning device F4 sequentially acquires the reception strengths of the signals from the portable terminal 2 from the multiple strength observation devices included in the in-vehicle system 1, and stores the acquired reception strengths in the RAM 113 by distinguishing the acquired reception strengths for each acquisition source. Then, the positioning device F4 determines whether or not the portable terminal 2 is present in the vehicle compartment based on the reception strength for each strength observation device stored in the RAM 113 and various determination thresholds registered in the flash memory 112. The specific operation of the positioning device F4, that is, the method of determining the position of the portable terminal 2 based on the reception strength of each strength observation device by the positioning device F4 will be described in detail later. The determination result of the positioning device F4 is referred to by the vehicle controller F5.

The vehicle controller F5 is configured to execute a vehicle control according to the position of the portable terminal 2 (in other words, the user) and the state of the vehicle Hv in cooperation with the body ECU 16 or the like when the authentication of the portable terminal 2 by the authentication processor F3 is successful. The state of the vehicle Hv is determined by the vehicle information acquisition device F1. The position of the portable terminal 2 is determined by the positioning device F4.

For example, when the portable terminal 2 is present outside the vehicle compartment and the user presses the door button 13 while the vehicle Hv is parked, the vehicle control unit F15 unlocks the door locking mechanism in cooperation with the body ECU 16. For another example, when the portable terminal 2 is determined to be present in the vehicle compartment by the positioning device F4 and it is detected that the start button 16 has been pressed by the user, the vehicle controller F5 starts the engine in cooperation with the engine ECU 15.

The vehicle controller F5 is configured to execute a vehicle control according to the position of the user and the state of the vehicle Hv with the user operation on the vehicle Hv as a trigger. However, some vehicle controls that can be executed by the vehicle controller F5 may be automatically executed according to the position of the user without requiring the user's operation on the vehicle Hv.

(Connection Related Process)

Figure 13:
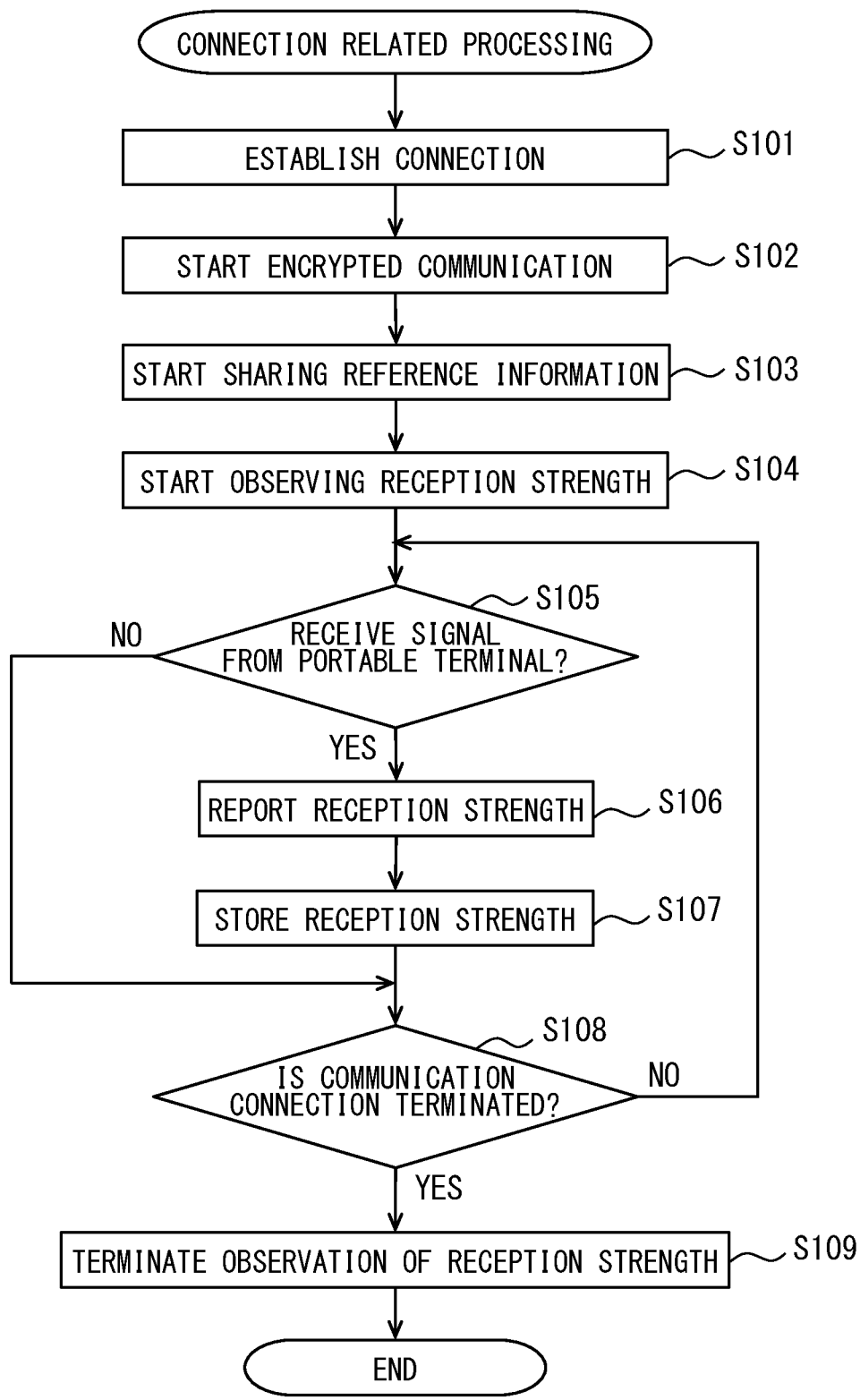
FIG. 13 is a flowchart of a connection related process to be executed by the in-vehicle system.

Next, a connection related process performed by the in-vehicle system 1 will be described with reference to a flowchart shown in FIG. 13. The connection related process is related to the establishment of the communication connection between the in-vehicle system 1 and the portable terminal 2. The connection related process shown in FIG. 13 may be started, for example, when the data communication device 12γ receives an advertisement packet from the portable terminal 2.

When the communication connection between the data communication device 12γ and the portable terminal 2 is not established, the operation of the strength observation device may be stopped in order to inhibit a dark current. The data communication device 12γ preferably always operates in a standby state in order to improve the responsiveness to the approach of the user. In the standby state a signal (for example, an advertisement packet) from the portable terminal 2 can be received.

In S101, the data communication device 12γ establishes a communication connection (that is, a connection) with the portable terminal 2, and the process proceeds to S102. When the communication connection with the portable terminal 2 is established, the data communication device 12γ provides the terminal ID of the portable terminal 2 communicatively connected to the data communication device 12γ to the smart ECU 11. Further, in the smart ECU 11, when the strength observation device is in an idle mode at the time when the communication connection with the portable terminal 2 is established, the data communication device 12γ outputs a predetermined control signal to the strength observation device and shifts to the standby mode. A pause mode is, for example, a state in which the receiving function of a signal is stopped. The pause mode includes a state in which the power is turned off.

In S102, the data communication device 12γ periodically performs an encrypted communication based on an instruction from the smart ECU 11. The content of the data exchanged at this time may be any content as long as the content requests the portable terminal 2 to transmit a response signal. The data content may be data for authenticating the portable terminal 2, such as a challenge code. The wireless communication with the portable terminal 2 is periodically executed so that the smart ECU 11 can confirm that the portable terminal 2 is present in the communication area.

In S103, the data communication device 12γ and the smart ECU 11 cooperate with one other to start sharing of the reference information. Specifically, the data communication device 12γ sequentially provides the terminal ID and the channel information of the portable terminal 2 connected by communication to the smart ECU 11. In addition, the smart ECU 11 sequentially distributes the channel information and the terminal ID provided from the data communication device 12γ to the respective strength observation devices as reference information.

In S104, each strength observation device start observing of the reception strength of signal from the portable terminal 2 by use of the reference information provided by the smart ECU 11. In other words, the strength observation device sets a channel having a number indicated in the channel information as a reception target among a large number of channels included in the Bluetooth standard. The strength observation device sequentially changes the channel to be received in accordance with the channel information provided from the smart ECU 11.

Even when the portable terminal 2 and the data communication device 12γ perform the wireless communication of the frequency hopping system with each other, the reception strength of the signal from the portable terminal 2 is acquired, and the reception strength is sequentially reported to the smart ECU 1. That is, the in-vehicle communication devices 12 included in the in-vehicle system 1 can detect the reception strength of a signal transmitted from the portable terminal 2 in a state where the confidentiality (in other words, security) of the communication between the in-vehicle system 1 and the portable terminal 2 is ensured.

In S105, the strength observation device determines whether a signal including the terminal ID indicated in the reference information has been received. In response to the signal including the terminal ID indicated in the reference information being received, the process proceeds to S106. In S106, the reception strength of the received signal is reported to the smart ECU 11. In S105 and S106, each strength observation device reports, to the smart ECU 11, the reception strength of the signal including the terminal ID indicated in the reference information among the signals received in the channel indicated in the channel information. In a case where the signal from the portable terminal 2 has not been received for a predetermined period in S105, the process proceeds to S108.

In S107, the smart ECU 11 executes a process of storing, in the RAM 113, the reception strength provided from each strength observation device by distinguishing the reception strength from one other corresponding to each strength observation device serving as the provider. Then, the process proceeds to S108. In S108, the smart ECU 11 and the data communication device 12γ cooperate with one other to determine whether the communication connection with the portable terminal 2 has been terminated. The case in which the communication connection with the portable terminal 2 is terminated is, for example, a case in which the data communication device 12γ cannot receive a signal from the portable terminal 2. When the communication with the portable terminal 2 is terminated, an affirmative determination is made in S108, and the process proceeds to S109. On the other hand, when the communication with the portable terminal 2 is still maintained, the process returns to S105.

In S109, the smart ECU 11 outputs a predetermined control signal to the strength observation device, and ends observing of the reception strength of the signal transmitted from the portable terminal 2. For example, the smart ECU 11 may cause, for example, the strength observation device to transition to the pause mode. When the processing in S109 is completed, this flow ends.

(Positioning Process)

Figure 14:
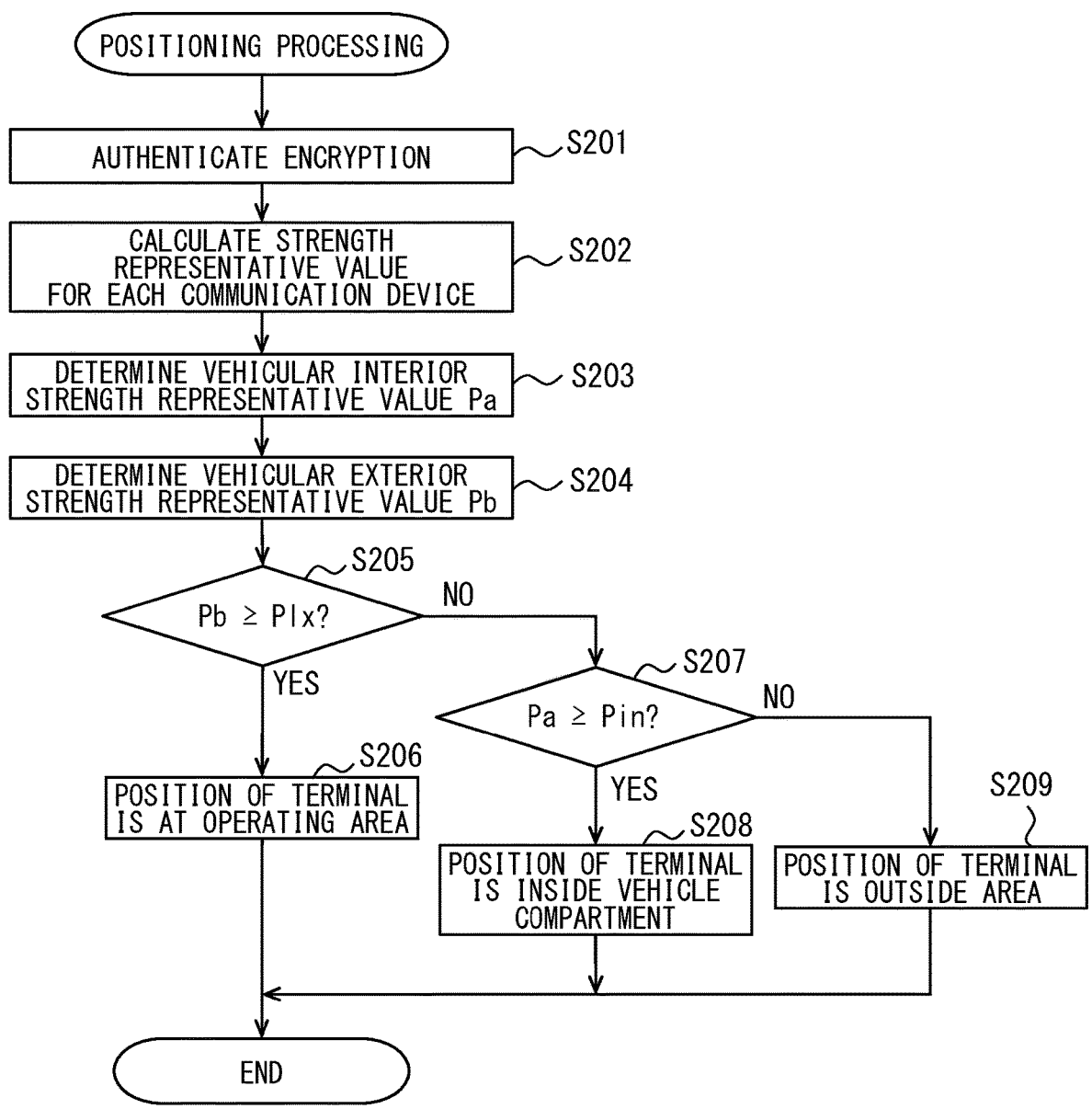
FIG. 14 is a flowchart of a positioning process to be executed by a smart ECU.

Next, the positioning process performed by the smart ECU 11 will be described with reference to a flowchart shown in FIG. 14. The positioning process is a process for determining the position of the portable terminal 2. The positioning process is performed, for example, at a predetermined positioning cycle in a state in which the communication connection between the data communication device 12γ and the portable terminal 2 is established. The positioning cycle is, for example, 200 milliseconds. The positioning cycle may be 100 milliseconds or 300 milliseconds.

First, in S201, the authentication processor F3 executes a process of authenticating the portable terminal 2 in cooperation with the data communication device 12γ, and the process proceeds to S202. Alternatively, S201 may be omitted. The authentication process can be appropriately changed according to an authentication time of the portable terminal 2. In S202, the positioning device F4 calculates the individual strength representative value of each strength observation device based on the reception strength of the signal received by each strength observation device. As described above, the reception strength of the signal received by each strength observation may be stored in the RAM 113. The individual strength representative value for one strength observation device is a value representative of the reception strength within a last predetermined time in the strength observation device. As an example, the individual strength representative value is an average value of the reception strengths of last N pieces. Such an individual strength representative value corresponds to a moving average value of the reception strength.

In the present embodiment, N may be a natural number of 2 or more, and is 5 in the present embodiment. In this case, the positioning device F4 calculates the moving average value by use of the reception strength of the portable terminal 2 acquired (in other words, sampled) at the last five points in time. It is needless to say that N may be 10, 20, or the like. As another aspect, N may be 1. The configuration in which N=1 corresponds to a configuration in which the latest reception strength is directly adopted as the individual strength representative value.

More specifically, the positioning device F4 in S202 calculates, as the individual strength representative value of the vehicular interior communication device 12α, an average value of the reception strengths with the latest five reception strengths provided from the vehicular interior communication device 12α as a population. In a situation where multiple vehicular interior communication devices 12α are provided, for each of the vehicular interior communication devices 12α, an average value of the reception strengths with the latest five reception strengths provided from the vehicular interior communication device 12α as a population.

In addition, the positioning device F4 calculates, as an individual strength representative value in the vehicular exterior right communication device 12K, an average value with the last five reception strengths provided from the vehicular exterior right communication device 12K as a population. Similarly, for other vehicular exterior communication devices 12β such as the vehicular exterior left communication device 12L and the vehicular vehicular exterior rear communication device 12M, the average value of the latest five reception intensities provided by the vehicular exterior communication device 12β is calculated.

The individual strength representative value of the strength observation device in which the number of reception strengths stored in the RAM 113 is less than N may be calculated by adding a value corresponding to a lower limit value of the reception strength detectable by the in-vehicle communication device 12 as the missed reception strength representative value. For example, the lower limit value of the reception strength detectable by the in-vehicle communication device 12 may be determined by the configuration of the in-vehicle communication device 12. For example, the lower limit may be set to −60 dBm or the like.

For example, even when only a part of the multiple strength observation devices included in the in-vehicle system 1 can receive the signal from the portable terminal 2 due to the position of the portable terminal 2, a subsequent process can be performed. For example, even when the vehicular exterior left communication device 12L cannot receive the signal from the portable terminal 2 because the portable terminal 2 is present on the right side of the vehicle Hv, the individual strength representative values for the respective strength observation devices can be calculated.

In the present embodiment, the average value of the last N reception strengths is used as the individual strength representative value, but the present disclosure is not limited to the above example. The individual strength representative value may be a median value or a maximum value of the last N reception strengths. The individual strength representative value may be an average value of the reception strengths obtained by removing the maximum value and the minimum value from the last N reception strengths. The individual strength representative value is preferably a value obtained by removing a variation component of the instantaneous reception strength. When the process in S202 is completed, the process proceeds to S203.

In S203, the positioning device F4 determines an interior device strength representative value Pa based on the individual strength representative values of the respective vehicular interior communication devices 12α. As an example, since there is only a single interior communication device 12α, the individual representative value for one interior communication device 12α is adopted as the interior device strength representative value Pa. As another aspect, in a situation where there are multiple interior communication devices 12α, the maximum value, the average value, or the median value of the individual strength representative values acquired from the respective interior communication devices 12α may be adopted.

In S204, the positioning device F4 determines an exterior device strength representative value Pb based on the individual strength representative values of the vehicular exterior communication devices 12β. In other words, the positioning device F4 according to the present embodiment adopts the maximum value of the individual strength representative values for each vehicular exterior communication device 12β as the exterior device strength representative value Pb. When the process in S204 is completed, the process proceeds to S205. As another aspect, the exterior device strength representative value Pa may be an average value or a median value of the individual strength representative values acquired from the respective the vehicular exterior communication devices 12β.

In S205, the positioning device F4 determines whether the exterior device strength representative value Pb is equal to or greater than the operating threshold value Plx. The operating threshold value Plx is a threshold value for determining the existence of the portable terminal 2 in the operating area Lx. The operating threshold value Plx may be designed based on the minimum value of the exterior device strength representative value Pb which can be observed when the portable terminal 2 is present in the operating area Lx. The minimum value of the exterior device strength representative value Pb that is observed in a state where the portable terminal 2 is existing in the operating area Lx may be determined based on the result of a test that measures the exterior device strength representative value at each observation point where the portable terminal 2 is disposed in the operating area Lx.

If a test result is obtained that the minimum value of the interior device strength representative value Pb which can be observed when the portable terminal 2 is present in the vehicle compartment is −40 dBm, the operating threshold value Plx may be set to −42 dBm which gives a predetermined margin to the minimum value −40 dBm. The operating threshold value Plx is equal to or smaller than the minimum value of the exterior device strength representative value Pb that can be observed in a situation where the portable terminal 2 is present inside the operating area Lx, and the operating threshold value Plx may be preferable to set to a value larger than or equal to the maximum value of the exterior device strength representative value Pb that can be observed in a situation where the portable terminal 2 is present inside the compartment. According to the setting of the operating threshold value Plx based on such a technical idea, the situation of the exterior device strength representative value Pb being larger than or equal to the operating threshold value Plx refers to a situation where the portable terminal 2 is present outside the vehicular compartment (in particular, the operating area Lx) but is not present inside the vehicular compartment. In addition, the operating threshold value Plx may be set to a value obtained by adding a predetermined margin to the maximum value of the exterior device strength representative values Pb that can be observed in a situation where the portable terminal 2 is present at a location 2 meters from the outer door handle.

In the determination of S205, in a situation where the exterior device strength representative value Pb is equal to or greater than the operating threshold value Plx, an affirmative determination is made in S205, and the process proceeds to S206. On the other hand, in a situation where the exterior device strength representative value Pb is less than the operating threshold value Plx, a negative determination is made in S206, and the process proceeds to S207. In S206, the positioning device F4 determines that the portable terminal 2 is existing inside the operating area Lx, and the process is ended.

In S207, the positioning device F4 determines whether or not the interior device strength representative value Pa is equal to or greater than a predetermined interior equivalent value Pin. The interior equivalent value Pin is a threshold for determining that the portable terminal 2 is present inside the vehicle compartment. The interior equivalent value Pin may be designed by, for example, an appropriate test. The interior equivalent value Pin may be set with reference to, for example, the minimum value of the interior device strength representative values that can be observed when only the portable terminal 2 is present at the vehicle compartment in a vacant state. The minimum value of the interior device strength representative values that can be observed when the portable terminal 2 is present in the vehicle compartment may be determined based on the result of a test for measuring the interior device strength representative value at each observation point in the vehicle compartment. When a test result indicates that the minimum value of the interior device strength representative value which is observed in a state where only the portable terminal 2 is existing in the vehicle compartment in a vacant state is −35 dBm, the default value P0 may be set to −38 dBm which gives a predetermined margin to the minimum value of −35 dBm. The vacant state may be referred to a situation where there is no luggage carried by a user or a situation where there are no any passengers. In other words, the vacant state refers to a situation there are no any objects other than the objects preliminarily installed inside the vehicle compartment. The interior equivalent value Pin may be designed with reference to, for example, the minimum value of the interior device strength representative values that can be observed when a person with an average physical size is seating on the driver seat. According to the setting of the interior equivalent value Pin based on such a technical idea, the situation of the interior device strength representative value Pa being larger than or equal to the interior equivalent value Pin implies that the portable terminal 2 is present inside the vehicle compartment.

In the determination of S207, in response to the compartment interior device strength representative value Pa is equal to or greater than the compartment interior equivalent value Pin, an affirmative determination is made in S207, and the process proceeds to S208. On the other hand, in response to the compartment interior device strength representative value Pa is less than the compartment interior equivalent value Pin, a negative determination is made in S207, and S209 is executed. In S208, the positioning device F4 determines that the portable terminal 2 is existing in the vehicle compartment, and the process is ended. In S209, the positioning device F4 determines that the portable terminal 2 is existing outside of the vehicle compartment, and the process is ended.

The respective determination results in S206, S208 and S209 are stored in the RAM 113 as the position information of the portable terminal 2, and are referred to by the vehicle controller F5 or the like. Hereinafter, a configuration for determining the position of the portable terminal 2 adopting the reception strength of a signal from the portable terminal 2 is referred to as a reception strength positioning system.

Upon describing requirements demanded as a PEPS system (in particular, the reception strength positioning system), the effects of installing the vehicular exterior right communication device 12K and the vehicular exterior left communication device 12L at the position and posture described in the embodiment.

Figure 15:
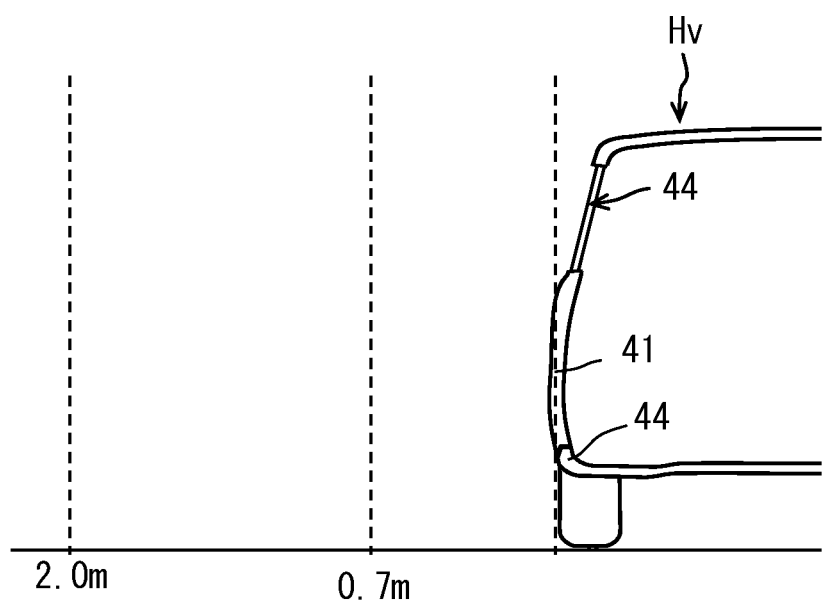
FIG. 15 is a diagram that illustrates requirements as a PEPS system.

In the PEPS system, in a situation where a user is located within a certain distance (for example, 2 meters) or longer from the exterior surface of the vehicle (for example, the outer door handle) as illustrated in FIG. 15 in view of theft prevention, it is demanded that the unlocking of the automatic door 41 through the wireless communication is prohibited. The requirements are based on the provisions of The Motor Insurance Repair Research Centre as an organization founded by the Association of British Insurers. Therefore, the in-vehicle system 1 may determine whether or not the portable terminal 2 is present within 2 meters from the vehicle Hv. The above-mentioned prohibiting area is set according to the requirement.

The range of two meters described above is one of indices, and many vehicle manufacturers often limit the area in which the PEPS system operates to a narrower range (in other words, a range narrower than the operating area Lx) in view of security enhancement. For example, the operating area Lx is often within 0.7 meter from the vehicle Hv. In other words, on the premise that the PEPS system can at least determine whether or not the portable terminal 2 is within two meters from the vehicle Hv with better precision, it is further demanded for the PEPS system to determine whether or not the portable terminal 2 is present within the predetermined operating area Lx. In addition, the precision of determining whether or not the portable terminal 2 is present in the vehicle compartment is also an important requirement for the PEPS system.

In the reception strength positioning system, the vehicular exterior right communication device 12K and the vehicular exterior left communication device 12L may be configured such that a meaningful difference in the reception strength of a signal from the portable terminal 2 is generated according to whether or not the portable terminal 2 is present within the operating area Lx. In the reception strength positioning system, the vehicular exterior right communication device 12K and the vehicular exterior left communication device 12L may be configured such that a remarkable difference in the reception strength of a signal from the portable terminal 2 is generated according to whether or not the portable terminal 2 is present within the vehicle compartment.

The inventors measured the electrical field strength distribution of the signal wirelessly transmitted from the antenna and calculated the maximum value of the electrical field strength distribution while changing the installation position of the vehicular exterior right communication device 12K at the right surface portion of the vehicle and the posture of the antenna 31. The electrical field strength and the reception strength of the transmitted signal are different physical quantities. However, due to the reversibility of transmission and reception, these physical quantities are in a proportional relationship and can be adopted as alternative characteristics. The results are shown in FIG. 16.

Figure 16:
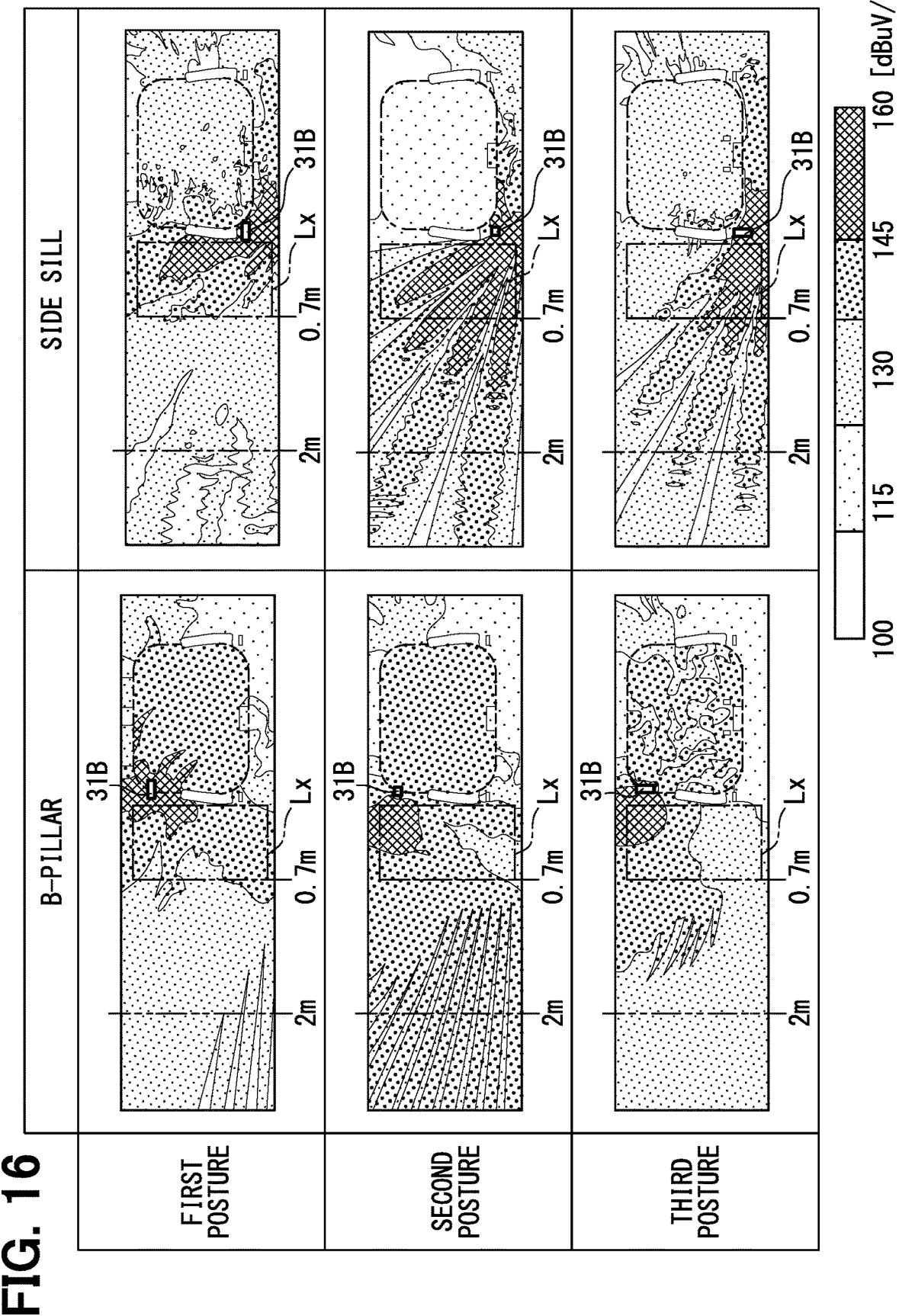
FIG. 16 is a diagram that illustrates a simulation result of the electrical field distribution at each mounting posture in a situation where an antenna mounts on a B-pillar and a side sill.

The simulation result shown in FIG. 16 is a result in a situation of adopting the dipole antenna 31B as the antenna 31. However, the similar result is attained in a situation of adopting the patch antenna 31A as the antenna 31. The electrical field strength shown in FIG. 16 indicates the maximum value of the respective electrical field strengths of three channels at 2402 MHz, 2442 MHz, and 2480 MHz. The transmission output is 30 dBm.

The first posture in FIG. 16 refers to a posture in which the dipole antenna 31B as the antenna 31 is parallel to the X-axis. In other words, the first posture corresponds to a posture in which the main lobe faces a direction perpendicular to the vehicular width (in other words, X-axis) and the plane of polarization is perpendicular to the side surface portion of the vehicle. The dipole antenna 31B has a donut-shaped radiation directivity (a figure "8"-shaped characteristic) toward the axis of the radiation element. For the dipole antenna 31B, the main lobe refers to a direction perpendicular to the axis of the radiation element. The first posture for the patch antenna 31A corresponds to a posture in which the radiation element 311 (in other words, the center of directivity) faces the Z-axis direction and the plane of polarization is perpendicular to the YZ plane.

The second posture refers to a posture in which the dipole antenna as the antenna 31 refers to a posture where the dipole antenna is parallel to the Y-axis. The second posture corresponds to a posture in which the main lobe is formed in the vehicular centrifugal direction. The vehicular centrifugal direction is parallel to the vehicular horizontal plane, and corresponds to a direction separated from the vehicle. The vehicular horizontal plane is a plane perpendicular to a vehicular height direction. The vehicular horizontal plane corresponds to the XY plane. The vehicular centrifugal direction for the vehicular right communication device 12K refers to a vehicular right direction. The vehicular centrifugal direction for the vehicular left communication device 12L refers to a vehicular left direction. The second posture for the patch antenna 31A corresponds to a posture in which the radiation element 311 (in other words, the center of directivity) faces the positive X-axis direction and the plane of polarization is orthogonal to the XZ plane.

Third posture refers to a posture in which the dipole antenna as the antenna 31 is parallel to the Z-axis. The third posture corresponds to a posture in which the main lobe is formed in the vehicular centrifugal direction. The third posture for the patch antenna 31A corresponds to a posture in which the radiation element 311 (in other words, the center of directivity) faces the Z-axis direction and the plane of polarization is orthogonal to the ZY plane.

In the configuration in which the dipole antenna 31B as the antenna 31 mounts on the B-pillar, the following tendencies are observed. In a situation where the antenna 31 is installed at the second and third postures, a stronger electrical field is generated near the window while the electrical field strength below the operating area Lx (for example, the door side) is at a lower level. Additionally, there is a region where the electrical field strength at the prohibiting area is relatively high. Therefore, it is difficult to distinguish the lower part of the operating area Lx from the prohibiting area. In a situation where the dipole antenna 31B as the antenna 31 is installed at the first posture, the entire operating area Lx becomes a strong electrical field area. However, the region inside the vehicle compartment has a higher electrical field strength. The strong electrical field described herein refers to, for example, 136 [dBuV/m] or more.

On the other hand, according to the configuration where the antenna 31 mounts on the side sill 42 (in particular, the bottom surface portion 421), the electrical field strength inside the vehicle compartment lowers as compared with the configuration in which the antenna 31 mounts on the B-pillar 45B. For example, in a situation where the antenna 31 is installed at the side sill 42 in the first posture, the average value of the electrical field strength inside the vehicle compartment is 10 dB or more lower than the situation where the antenna 31 is installed at the B-pillar 45B in the first posture. Therefore, according to the configuration in which the antenna 31 is installed at the side sill 42, it is easier to determine whether the portable terminal 2 is present at operating area Lx or inside the vehicle compartment, as compared with the configuration in which the antenna 31 mounts on the B-pillar 45.

In the configuration of adopting the side sill 42 as the mounting position for the antenna 31, the following situation is observed as the difference in the installation postures of the antenna 31. In other words, in a situation of mounting the antenna 31 in the first posture, it is possible to suppress the electrical field strength outside the area to a low level. Additionally, the electrical field strength in the operating area Lx is entirely at a high level. In a situation of mounting the antenna 31 on the side sill 42 in the first posture, it is possible to enhance the precision for identifying whether the portable terminal 2 is inside the operating area Lx or outside the area.

In the configuration of adopting the side sill 42 as the mounting position for the antenna 31, in a situation where the antenna 31 is installed in the second and third postures, the electrical field outside the area is relatively high since the main lobe faces the vehicular centrifugal direction. In addition, in the configuration of adopting the side sill 42 as the mounting position for the antenna 31, in a situation where the antenna 31 is installed in the third posture, the electrical field strength in an upper part within the operating area Lx is at a low level. Therefore, it is difficult to determine whether the portable terminal 2 is present at the operating area Lx or outside the area.

Based on the above test results, it is understood that the antenna 31 is installed at the side sill 42 in a posture in which the center of directivity faces the upper part of the vehicle (in other words, the positive Z-axis direction). According to such an installation and a posture, it is possible to generate a meaningful difference between the electrical field strength (in other words, the reception strength according to another aspect) in the operating area Lx and the electrical field strength outside the area. Additionally, it is possible to suppress the reception strength inside the vehicle compartment to a low level. Accordingly, it is possible to determine, with higher precision, whether the portable terminal 2 is present outside the area, inside the operating area Lx or inside the vehicle compartment by adopting the reception strength of the signal from the portable terminal 2.

Figure 17:
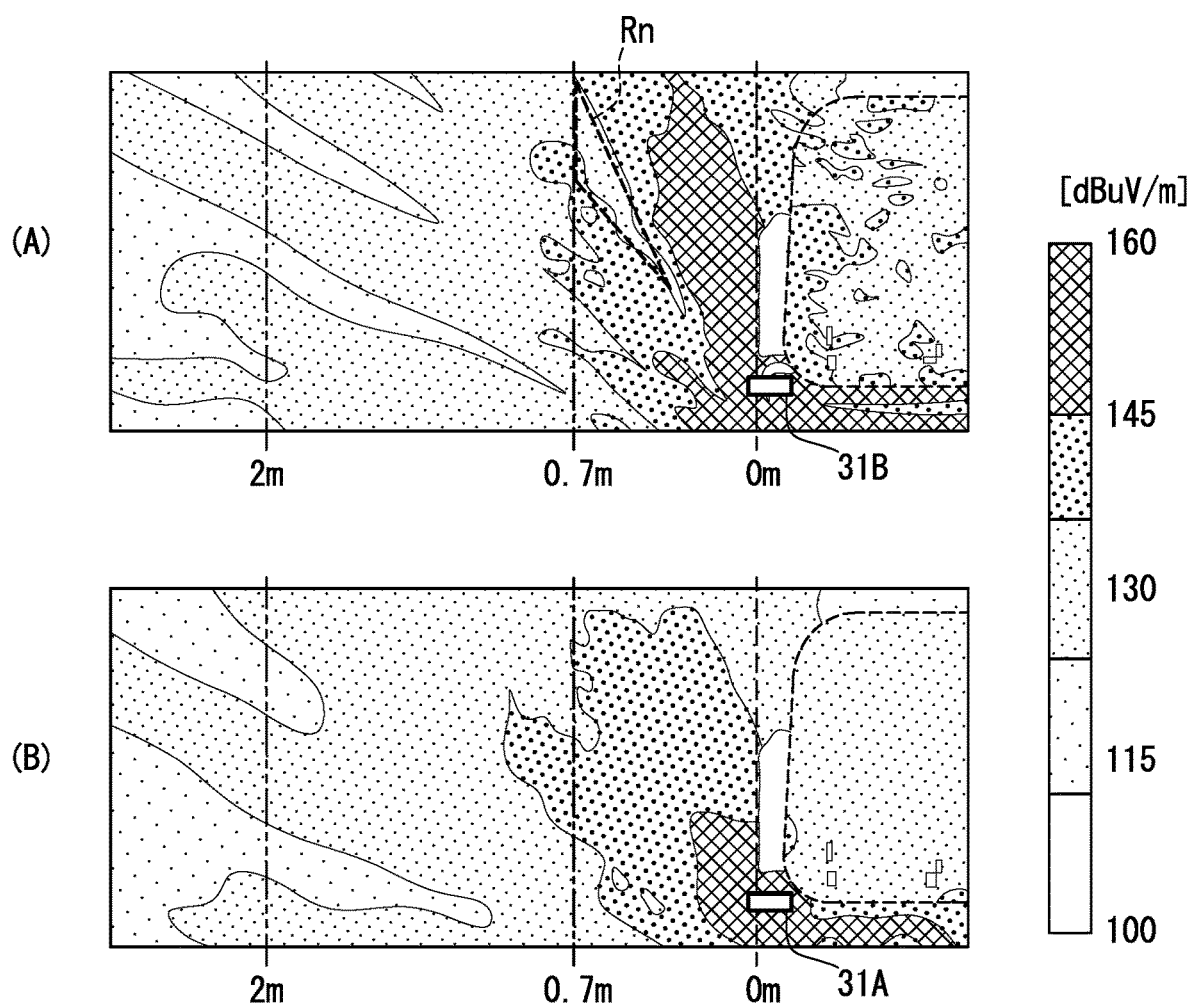
FIG. 17 is a diagram that illustrates a simulation result of the electrical field distribution in a situation where the antenna is configured as a dipole antenna and a patch antenna.

In a situation where the antenna 31 is installed at the side sill 42 in a posture where the main lobe faces the upper part of the vehicle, the test result of the electrical field distribution when adopting the dipole antenna as an antenna structure and the test result of the electrical field distribution when adopting the patch antenna are shown in FIG. 17. (A) of FIG. 17 illustrates the electrical field strength distribution of the dipole antenna as the antenna 31. (B) of FIG. 17 illustrates the electrical field strength distribution of the patch antenna as the antenna 31.

In the configuration of adopting the dipole antenna as the antenna 31, a null region Rn inside the operating area Lx is formed as shown in FIG. 17. The null region Rn described herein is a region having an electrical field strength is significantly lower as compared with other regions. The following actions are considered as the cause for this situation. When the dipole antenna is adopted as the antenna structure, a relatively strong radio wave is emitted not only in the vehicular upward direction, but also in the vehicular downward direction. The dipole antenna has a donut-shaped radiation directivity (radiation pattern) that is rotationally symmetric with respect to the axis of the radiation element. The radio wave emitted from the dipole antenna as the antenna 31 in the vehicular downward direction is reflected at a ground surface, and may interfere with a radio wave directly emitted in an upward direction (hereinafter referred to as a direct wave) from the dipole antenna. As a result, it is considered that the null region Rn is formed in a part of the operating area Lx by interference such that the radio wave reflected at the ground surface (hereinafter referred to as ground reflected wave) and the direct wave in the upward direction are weaken together. In the configuration of adopting the dipole antenna 31B as the antenna 31, since the null region Rn may be generated, it is highly possible to erroneously determine the position of the portable terminal 2.

On the other hand, according to the configuration of adopting the patch antenna as the antenna structure, a relatively strong radio wave is not emitted from the radiation element 311 to the bottom part of the vehicle. The patch antenna has a back lobe negligibly smaller than the main lobe due to its structure. According to the configuration of adopting the patch antenna as the antenna structure, it is difficult to generate the null region Rn caused by the reflected wave from the ground surface. As a result, it is possible to entirely set the electrical field strength in the operating area Lx to a high level. It is also possible to suppress variation in the electrical strength at the operating area Lx.

Based on the above test results, it is understood that the patch antenna is preferable than the dipole antenna for the antenna 31; the side sill 42 is preferable as the mounting position; and the first posture is preferable as the installation posture. Hereinafter, as in the present embodiment, a configuration in which the patch antenna 31A mounts on the side sill in a posture such that the main lobe faces the upper part of the vehicle and the plane of polarization is perpendicular to the side surface portion is referred to as a main proposed configuration. In a situation of adopting another type of antenna other than the patch antenna for the antenna 31, a configuration in which the antenna 31 mounts on the side sill 42 in a posture such that the main lobe faces upward and the plane of polarization is perpendicular to the side surface portion is referred to as an auxiliary proposed configuration. As the antenna other than the patch antenna, a variety of antenna such as a dipole antenna, a monopole antenna, an inverted F-antenna, an inverted L-antenna or the like may be adopted. An antenna capable of adopting a linear radiation element 311 such as a dipole antenna, a monopole, an inverted F-antenna, an inverted L-antenna may be described as a linear antenna. The installation posture in which the plane of polarization is perpendicular to the side surface portion is not limited to the installation posture where the main plane of polarization is perpendicular to the side surface portion. In a situation of adopting an antenna in which the auxiliary plane of polarization has a sufficiently strong level, the posture in which the auxiliary plane of polarization is perpendicular to the side surface portion corresponds to the posture in which the plane of polarization is perpendicular to the side surface portion. The sufficiently strong auxiliary plane of polarization may have a level difference within 5 dB as compared with the main plane of polarization.

Figure 18:
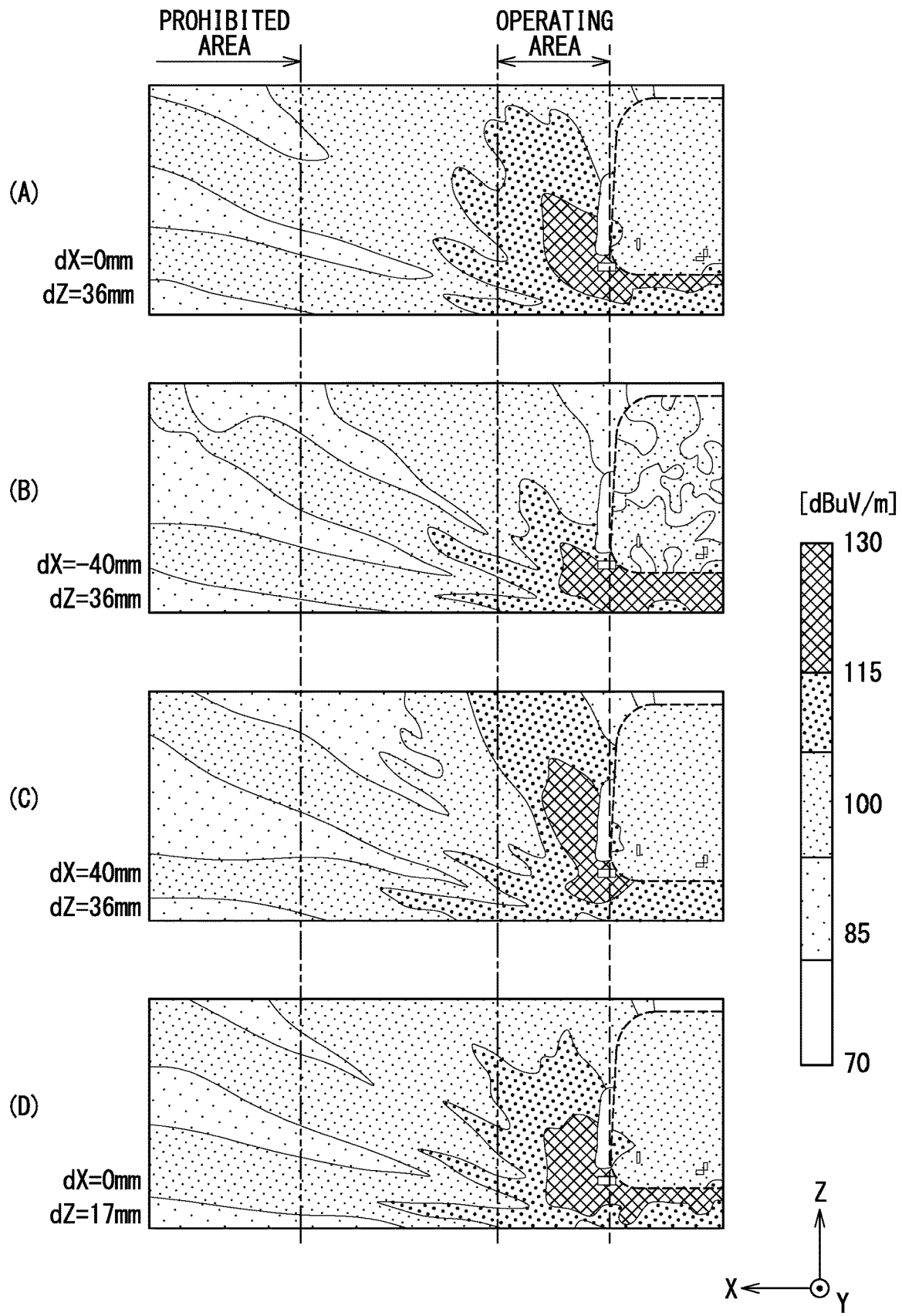
FIG. 18 is a diagram that illustrates a result of experimenting the influence on the electrical field distribution through the relative position of a patch antenna as an antenna in relation to the side sill.
Figures 19, 20:
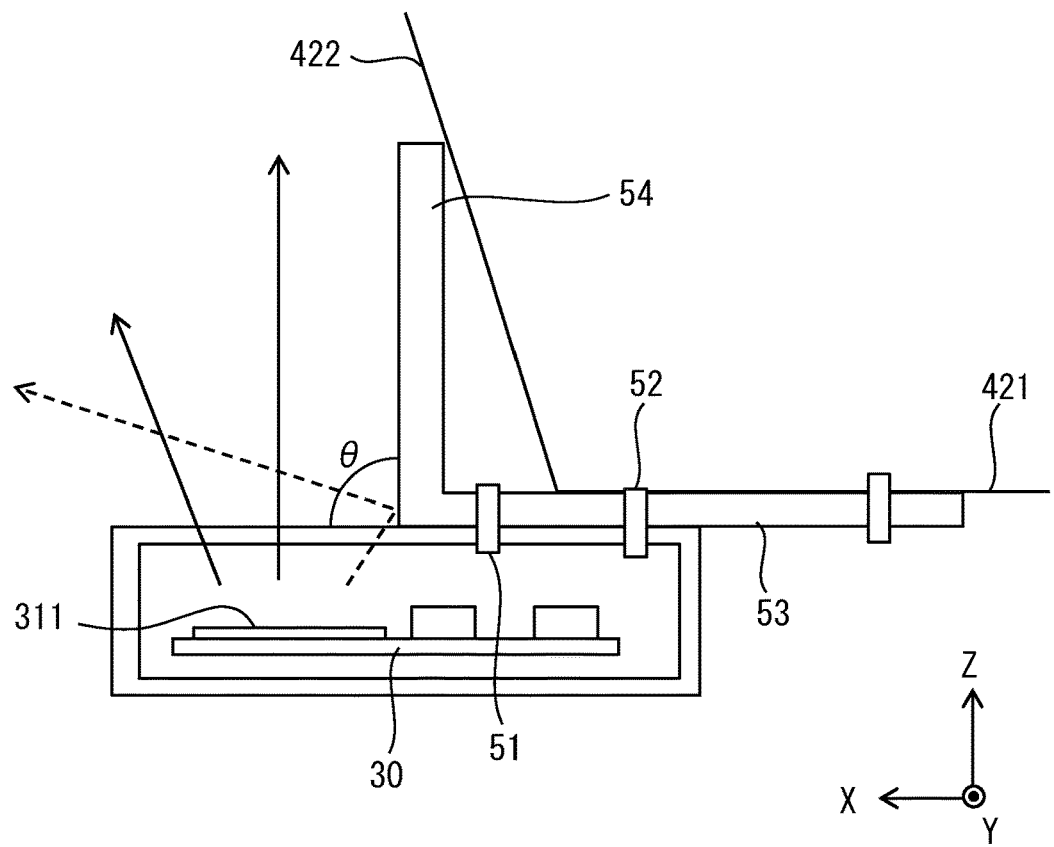
FIG. 19 is a diagram showing a relationship between a relative position of a patch antenna as an antenna in relation to the side sill and an expected determination precision.
FIG. 20 is a diagram that illustrates the configuration of a mounting bracket in a third modification.

Further, in the main proposed configuration, the inventors measured the electrical field strength distribution of a signal wirelessly transmitted from the antenna while changing a protruding amount dX and a relative height position dZ indicating the position of the radiation element 311 with respect to the bottom surface portion 421 in the height direction. The measurement results are shown in FIGS. 18 and 19. In FIG. 18, the simulation was performed in a state where the transmission power was lowered by about 30 dBm from the transmission illustrated in other drawing. The electrical field strength illustrated in FIG. 18 is generally lower than that illustrated in other drawing. In the simulation result shown in FIG. 18, for example, a region of 106 [dBuV/m] or more can be regarded as a strong electrical field area.

The positive protruding amount dX illustrates a situation where the radiation element 311 protrudes from the side-sill side surface portion 422 to the outer side of the vehicle, and the negative protruding amount dX illustrates a situation where the radiation element 311 enters into the vehicle from the side-sill side surface portion 422. The positive relative height position dZ represents a situation where the radiation element 311 is located below the bottom surface portion 421. The negative relative height position dZ represents a situation where the radiation element 311 is located above the bottom surface portion 421. As illustrated in FIG. 11, the negative relative height position dZ can be taken only when the radiation element 311 is completely located outside the side-sill side surface portion 422.

(A) of FIG. 18 illustrates a simulation result of the electrical field strength distribution when the protruding amount dX=0 mm and the relative height position dZ=36 mm are set. (B) of FIG. 18 illustrates a simulation result of the electrical field strength distribution when the protruding amount dX=−40 mm and the relative height position dZ=36 mm are set. (C) of FIG. 18 illustrates a simulation result of the electrical field strength distribution when the protruding amount dX=40 mm and the relative height position dZ=36 mm are set. (D) of FIG. 18 illustrates a simulation result of the electrical field strength distribution when the protruding amount dX=0 mm and the relative height position dZ=17 mm are set.

Hereinafter, a configuration in which the electrical field strength within the operating area Lx at any region is larger than or equal to the maximum electrical field strength at the prohibiting area is evaluated as a configuration capable of suppressing erroneous determination rate to a predetermined target level. For a configuration in which the electrical field strength at any region within the operating area Lx is larger than or equal to the maximum electrical field strength at the prohibiting area, it is possible to determine whether or not the portable terminal 2 is present in the operating area Lx in the entire region of the operating Lx by setting the operating threshold value Plx to the maximum electrical field strength at the prohibiting area.

The configuration in which the erroneous determination rate is suppressed to a predetermined target level corresponds to a configuration capable of setting the operating threshold value Plx (in other words, such an existing value), which can suppress the erroneous determination rate to a predetermined target level. The erroneous determination rate described herein refers to the percentage of a region, in which the portable terminal 2 has an error in determining the portable terminal 2 is present outside the area, occupying the entire operating area Lx. The configuration capable of setting the threshold value for suppressing the erroneous determination rate to a predetermined target level corresponds to a configuration in which, in particular, a threshold value smaller than or equal to an upper limit value of a predetermined tolerance range of the percentage of the entire operating area Lx occupied by the region in which the portable terminal 2 is erroneously determined as being present outside the area. The tolerance upper limit value is a parameter which is properly designed according to a level demanded as the precision of the PEPS system. The tolerance upper limit value is set to 0% herein. However, the tolerance upper limit value may also be set to 3% or 5%.

As illustrated in (A) of FIG. 18, in a situation where the protruding amount dX=0 mm and the relative height position dZ=36 mm are set, a strong electrical field is entirely generated inside the operating area Lx, and a meaningful difference in the electrical field strength between the operating area Lx and outside the area (in particular, the prohibiting area). Any region in the operating area Lx has an electrical field strength larger than or equal to the maximum electrical field strength outside the area. In other words, according to the above configuration, it is understood that the erroneous determination rate can be suppressed to a predetermined target level.

As illustrated in (B) of FIG. 18, in a configuration where the protruding amount dX=−40 mm, in other words, a configuration where the center of the radiation element 311 enters under the vehicle body, the region inside the operating area Lx where the electrical field strength falls under the maximum electrical field strength outside the area is present. In particular, the region above the operating area Lx has an electrical field strength falling under the maximum electrical field strength outside the area. In other words, according to the above configuration, it is understood that it is difficult to suppress the erroneous determination rate to a predetermined target level. The above reasons are presumed to be caused by a body (for example, the side sill 42) blocks most or all of the main lobe of the antenna 31.

As shown in (C) of FIG. 18, in a configuration where the protruding amount dX=40 mm and the relative height position dZ=36 mm are set, the region below the operating area Lx (for example, the lateral side of the antenna 31) has an electrical field strength falling under the maximum electrical field strength outside the area. In other words, according to the above configuration, it is understood that it is difficult to suppress the erroneous determination rate to a predetermined target level. It is considered that the patch antenna itself does not have the directivity to the vehicular centrifugal direction. The following describes specific examples. In the configuration where the center of the radiating element 311 largely pops out from the side-sill side surface portion 42, it is difficult to have a situation where the radio wave emitted from the radiating element 311 is reflected at the side-sill side surface portion 422 to the vehicular centrifugal direction (in other words, the lateral side of the vehicle). As shown in (C) of FIG. 18, in the region below the operating area Lx (for example, the lateral side of the antenna 31) has an electrical field strength easily falling under the maximum electrical field strength outside the area.

The reason why the better electrical field strength distribution can be attained in the configuration in which the protruding amount dX is suppressed with respect to the configuration in which the protruding amount=40 mm is set is that the radiating element 311 and the side sill 42 are in a positional relationship in which a part of the main lobe is reflected at the side-sill side surface portion 422. In other words, in the configuration where the pop-up amount dX=0 mm and the relative height position dZ=36 mm are set, a part of the radio wave emitted by the radiating element 311 is reflected at the side-sill side surface portion 422 towards the vehicular centrifugal direction so that the electrical field strength at the lateral side of the antenna 31 rises. In view of such test results, in a situation where a directional antenna is adopted as the antenna 31, it may be preferable that the antenna 31 is installed in a posture where the center of the main lobe faces upside the vehicle, a part (for example, half) of the main lobe strikes on the side-sill side surface portion 422 or the bottom surface portion 421. The configuration in which the radio wave is emitted by the radiation element 311 and is reflected towards the vehicle centrifugal direction also includes a configuration in which the radio wave emitted by the radiating element 311 in a direction tilted upward or downward by about ±45° from the vehicular centrifugal direction.

As illustrated in (D) of FIG. 18, in the configuration where the protruding amount dX=0 mm and the relative height position dZ=17 mm are set, the electrical field strength in the upper region inside the operating area Lx falls under the maximum electrical field strength at the prohibiting area. In other words, according to the above configuration, it is understood that it is difficult to suppress the erroneous determination rate to a predetermined target level. In a situation where the distance between the radiating element 311 and the bottom surface portion 421 is too short, the radio waves radiated by the radiating element 311 are difficult to diffract. In the configuration where the most of the radio waves emitted by the radiating element 311 is reflected at the bottom surface portion 421 of the side sill 42, the radio waves which cannot be diffracted upside the vehicle are dispersed in the vehicular width direction due to the reflection. As a result, the electric field strength in the prohibiting area also rises relatively, which may cause an erroneous determination.

In view of the test results shown in (A) and (D) of FIG. 18, it may be preferable that the separation distance dZ between the radiating element 311 and the bottom surface portion 421 is larger so that the radio wave emitted by the radiation element 311 can be diffracted at the upside of the vehicle.

FIG. 19 illustrates the result of determining whether or not the erroneous determination rate could be suppressed to a predetermined target level for each combination of the protruding amount dX and the relative height position dZ. The circular symbol "o" indicates that the erroneous determination rate can be suppressed to a predetermined target level, and the cross mark "x" indicates that the erroneous determination rate were difficult to be suppressed to a predetermined target level. From the test results illustrated in FIG. 19, the poo-out amount dX may be set to about 0 mm to 20 mm. According to such a configuration, a part of the radio waves from the radiation element 311 directly propagate towards upside the vehicle, and a part of the radio waves are reflected at the side-sill side surface portion 422 and face towards the vehicular centrifugal direction. The linear distance between the radiating element 311 and the side sill 42 may be 26 mm or longer. According to such a configuration, a part of the radio waves from the radiation element 311 is directed to upside the vehicle through diffraction or reflection.

In a situation where the main proposed configuration as the vehicular right communication device 12K is adopted; the protruding amount dX of the radiation element 311 is set to 20 mm; and the relative height position dZ is set to 36 mm, since most of the radiated radio waves face upside the vehicle, the strong electrical field can be made around the window. The side-sill side surface portion 422 functions as a reflector, and a part of the radiated radio waves can propagate in the vehicular centrifugal direction. As a result, the electrical field strength in the entire operating area Lx can be set to a high level, and a meaningful difference between the electrical field strength in the operating area Lx and the electrical field strength in the prohibiting area. Since the propagation path of the wireless signal is reversible, a meaningful difference exists between the electrical field strength in the operating area Lx and the electrical field strength in the prohibiting area. This refers to a situation where a meaningful difference occurs in the observed reception strength between a situation where the portable terminal 2 is present in the operating area Lx and in a situation where the portable terminal 2 is present in the prohibiting area.

According to the above configuration, in a situation where the position of the portable terminal 2 is determined by adopting the reception strength of the signal from the portable terminal 2, it is possible to reduce erroneous determination of the position of the portable terminal 2. Although the operation and effect of the compartment exterior right communication device 12K is described above, the description can also be applied to the compartment exterior left communication device 12L.

While the embodiments of the present disclosure have been described above, the present disclosure is not limited to the embodiments described above, and various modifications to be described below are included in the technical scope of the present disclosure, and may be implemented by various modifications within a scope not departing from the spirit described below. For example, various modifications to be described below can be implemented in combination as appropriate within a scope that does not cause technical inconsistency.

Note that members having the same functions as those described in the above embodiment are denoted by the same reference numerals, and a description of the same members will be omitted. When only a part of the configuration is described, the configuration described in the above embodiment can be applied to the other part.

(First Modification)

The above embodiment describes an aspect in which the positioning device F4 determines whether or not the portable terminal 2 is present inside the vehicle compartment, in a situation where the interior device strength representative value Pa is larger than or equal to the interior equivalent value Pin. However, the determination algorithm is not limited to this situation. A variety of algorithms may be adopted as the algorithm for determining whether or not the portable terminal 2 is present inside the vehicle compartment. For example, the positioning device F4 may determine whether the portable terminal 2 is present inside the vehicle compartment, based on a condition that the interior device strength representative value Pa is larger than or equal to the exterior device strength representative value Pb.

Therefore, the positioning device F4 can determine that the portable terminal 2 is present in the vehicle compartment based on a condition that: the interior device strength representative value Pa is equal to or larger than the interior equivalent value Pout; and the exterior device strength representative value Pb is less than the exterior equivalent value Pout. The exterior equivalent value Pout described herein is a threshold value for determining that the portable terminal 2 is present outside the vehicle compartment, and is a parameter different from the operating threshold value Plx. The exterior equivalent value Pout may be set to a value for adding a predetermined margin (for example, 3 dBm) to the maximum value of the exterior device strength representative value which can be observed in a situation where the portable terminal 2 is present inside the vehicle compartment. The maximum value of the exterior device strength representative value that is observed in a state where the portable terminal 2 is present in the vehicle compartment may be determined based on the result of a test that measures the exterior device strength representative value at each observation point where the portable terminal 2 is disposed in the vehicle compartment. Since the exterior equivalent value Pout is set to be equal to or greater than the maximum value of the exterior device strength representative value which is observed when the portable terminal 2 is present in the vehicle compartment, the situation in which the exterior device strength representative value Pb is equal to or greater than the exterior equivalent value Pout means that the portable terminal 2 is present outside of the vehicle compartment.

The above determination algorithm determines that the portable terminal 2 is present inside the vehicle compartment, in a situation where: the interior device representative value Pa is larger than or equal to the interior equivalent value Pin and; the exterior device strength representative value Pb is less than the exterior equivalent value Pout. In a situation where the exterior device strength representative value Pb is larger than or equal to the exterior equivalent value Pout even if the interior device strength representative value Pa is larger than or equal to the interior equivalent value Pin, or in a situation where the interior device strength representative value Pa is smaller than the interior equivalent value Pin, the portable terminal 2 is determined to be outside the vehicle compartment. The exterior equivalent value Pout may be set to the minimum value of the exterior device strength representative value to be observed in a situation where the portable terminal 2 is present inside a leakage area where the interior communication device 12α is formed outside the vehicle compartment. The leakage region is a region where the interior device strength representative value Pa is larger than or equal to the interior equivalent value Pin outside the vehicle compartment. The region that can be a leakage region is mainly in the vicinity of the window 44. The vicinity of the window 44 refers to a range within a few centimeters to a few tens of centimeters from a window frame.

The positioning device F4 may determine whether or not the portable terminal 2 is present inside the vehicle compartment by adopting the interior device strength representative value Pa, the high-level threshold value and the low level threshold value. The high-level threshold value is a threshold value for determining whether or not the portable terminal 2 is present inside the vehicle compartment. The high-level threshold value is set to a value higher than the low-level threshold value. For example, the high-level threshold value may be designed based on the interior device strength representative value Pa as reference in a situation where the portable terminal 2 is present inside the vehicle compartment (in particular, the surrounding of the driver seat), which is specified by, for example, a test. The high-level threshold value may be set to a value sufficiently larger than the interior device strength representative value Pa to be observed in a situation where the portable terminal 2 is present at the prohibiting area based on a result of the above test. For example, the high-level threshold value is set to −40 dBm. The low-level threshold value is a threshold value for determining whether or not the portable terminal 2 is present outside the vehicle compartment. Similar to the high-level threshold value, the specific value for the low-level threshold value may be appropriately designed based on the result of testing the correspondence relation between the position of the portable terminal 2 and the interior device strength representative value Pa. It may be preferable that the low-level threshold value is set to a value 10 dBm or more lower than the high-level threshold value. For example, it is set to −50 dBm. In the above configuration, the positioning device F4 determines that, in a situation where the interior device strength representative value Pa becomes larger than or equal to the high-level threshold value, determines that the portable terminal 2 is present inside the vehicle compartment until the interior device strength representative value Pa becomes less than the low-level threshold value. In a situation where the interior device strength representative value Pa becomes less than the low-level threshold value, the positioning device F4 may determine that the portable terminal 2 is present outside the vehicle compartment until the interior device strength representative value Pa becomes larger than or equal to the high-level threshold value. A variety of the determination algorithms may be applied to determine whether or not the portable terminal 2 is present inside the vehicle compartment also for determining whether or not the portable terminal 2 is present at the operating area Lx.

(Second Modification)

The patch antenna 31A may be provided with a cut-away part which functions as a degeneracy separation element or a perturbation element or may be provided with the feeding points at two positions so as to be capable of transmitting and receiving a circularly polarized wave. According to such a configuration, it is possible to reduce variation in the reception strength at the in-vehicle communication device 12 according to the posture of the portable terminal 2.

In a configuration where the feeding points are correspondingly provided at two locations, the feeding points to be operated may be alternately switched. According to such a configuration, it is possible to reduce variation in the reception strength at the in-vehicle communication device 12 according to the posture of the portable terminal 2.

(Third Modification)

As shown in FIG. 20, the bracket 5 includes a main body 53 for fixing the antenna 31 to the bottom surface portion 421, and a configuration 54 (hereinafter referred to as a reflector) for reflecting the radio waves reflected from the antenna 31 towards the lateral side of the vehicle (in particular, the vehicular centrifugal direction). Both the main body 53 and the reflector 54 are plate conductor members. The L-shaped bracket 5 may be manufactured by bending one sheet of metal plate. The angle of the reflector 54 relative to the main body 53 may be adjusted so that a desired operating area Lx is formed. The angle θ of the reflector 54 relative to the main body 53 (or the radiation element 311) may be adjusted in a range of 60° to 90°. According to such a configuration, the strong electric field area formed by the radiation element 311 can be enlarged in the vehicular centrifugal direction.

(Fourth Modification)

Figure 21:
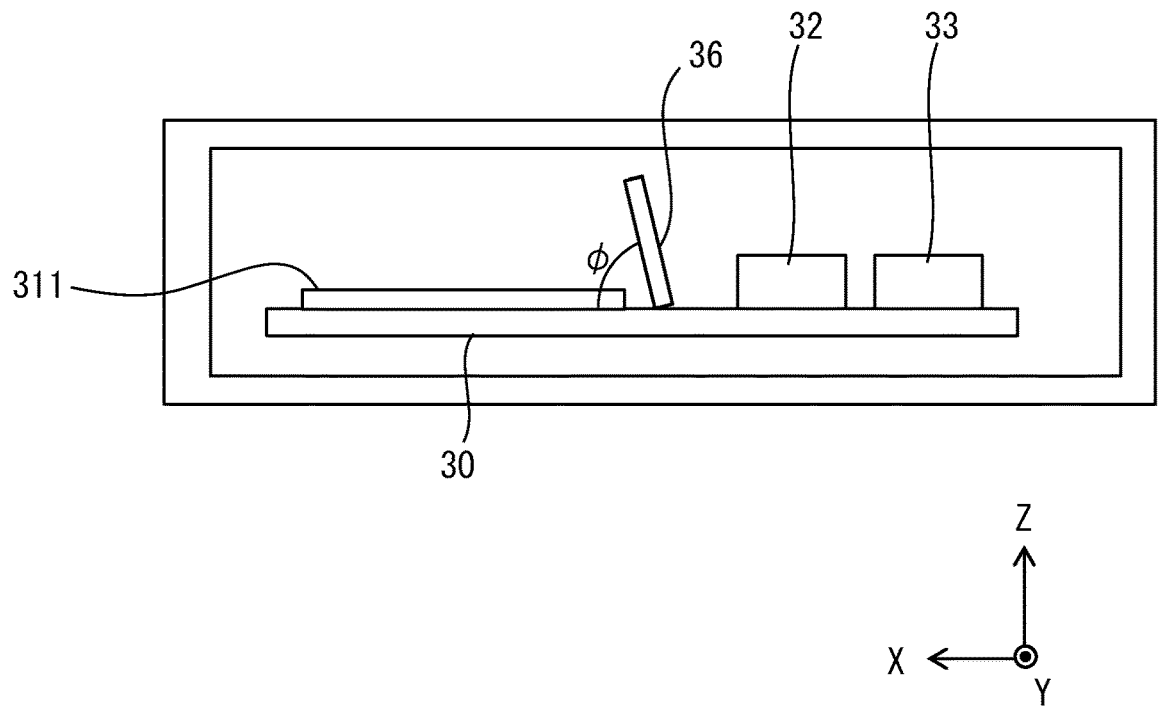
FIG. 21 is a diagram showing an inner configuration of a vehicular exterior right communication device in a fourth modification.

The configuration corresponding to the reflector 54 may be set inside the housing 35. In other words, as illustrated in FIG. 21, the vehicular exterior right communication device 12K and the vehicular exterior left communication device 12L may have the reflector 36 in the vicinity of the radiation element 311 for reflecting the radiated radio wave. According to another aspect, the reflector 36 reflects the radio wave arrived from the vehicular centrifugal direction towards the radiation element 311. The reflector 36 is, for example, a flat metal body. The angle φ formed by the reflector 36 with respect to the radiating element 311 may be appropriately adjusted in the range of 60° to 90° so as to acquire a desired directivity.

Figure 22:
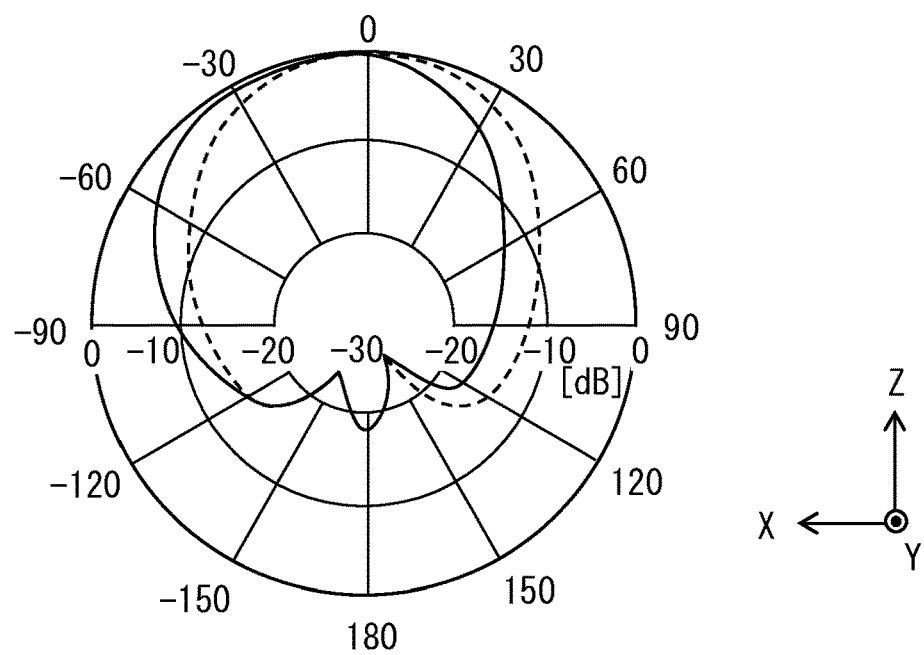
FIG. 22 is a diagram that explains a functional effect of a reflector.

According to such a configuration, it is possible to enhance the directivity (for example, the reception sensitivity) with respect to the vehicular centrifugal direction provided by the patch antenna 31A. The broken line in FIG. 22 represents the directivity of a general patch antenna. The solid line in FIG. 22 represents the effective directivity of the vehicular exterior right communication device 12K corrected by the presence of the reflector 36. By applying the similar configuration to the vehicular exterior left communication device 12L, it is possible to enhance or enlarge the directivity in the vehicular centrifugal direction (in particular, negative X-axis direction). The surface of the reflector 36 may be provided with unevenness for adjusting the reflection direction of the radiating radio wave or the reflection amount. The vicinity of the radiation element 311 refers to, for example, a region within 50 mm from the radiation element 311. The vicinity of the radiation element 311 includes at least the interior of the housing 35. The vicinity of the radiation element 311 corresponds to the vicinity of the antenna 31.

The reflector 54 or the reflector 36 is provided under the radiation element 311 as a configuration for functioning an antenna other than the patch antenna 31A (for example, the dipole antenna 31B) as an antenna having the directivity similar to the patch antenna. The reflector 54 or the reflector 36 may be placed in the vicinity of the radiation element 311 as a member for correcting or adjusting the directivity, in a situation of adopting the antenna other than the patch antenna 31A. The reflector 54 or the reflector 36 may be provided under the radiation element 311 for enhancing the directivity of the patch antenna 31A to the upside of the vehicle.

(Fifth Modification)

Figure 23:
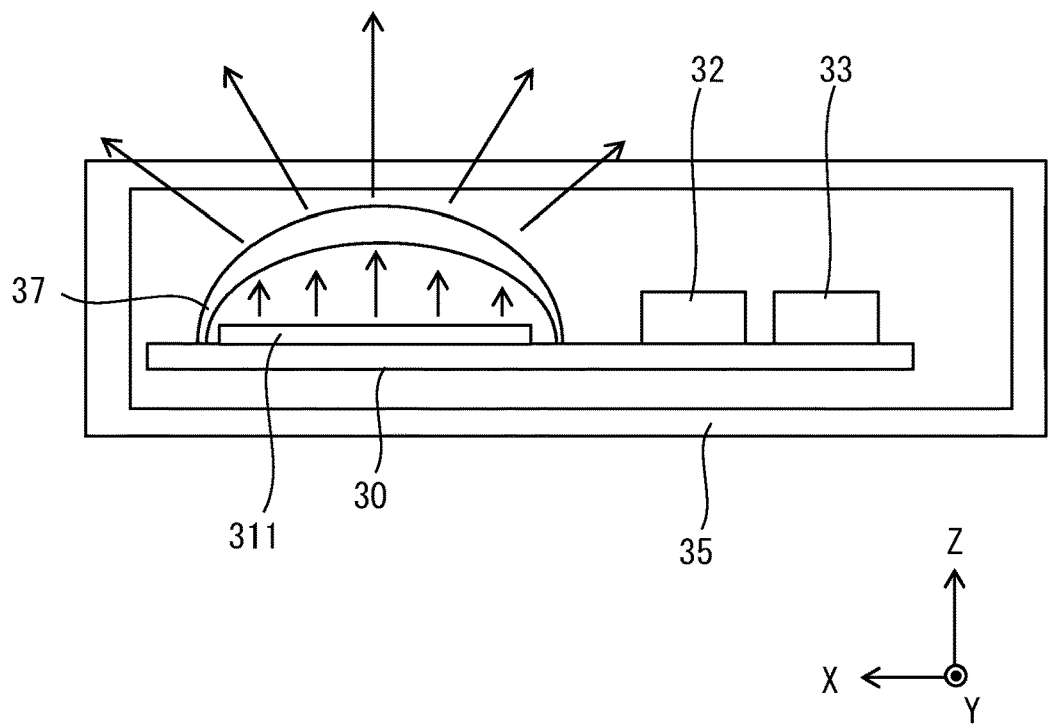
FIG. 23 is a diagram showing an inner configuration of a vehicular exterior right communication device in a fifth modification.

The fourth modification discloses an aspect in which the reflector 36 is adopted for correcting the directivity of the antenna 31 (and the strong electrical field area formed by the antenna 31) to be adapted to a predetermined operating area Lx. However, the method for correcting the directivity of the antenna 31 is not limited to this situation. For example, the directivity of the antenna 31 may be enlarged in the vehicular centrifugal direction by providing a prism 37 to diffract and disperse the electromagnetic wave at the upper side of the radiation element 311, as shown in FIG. 23.

Figure 24:
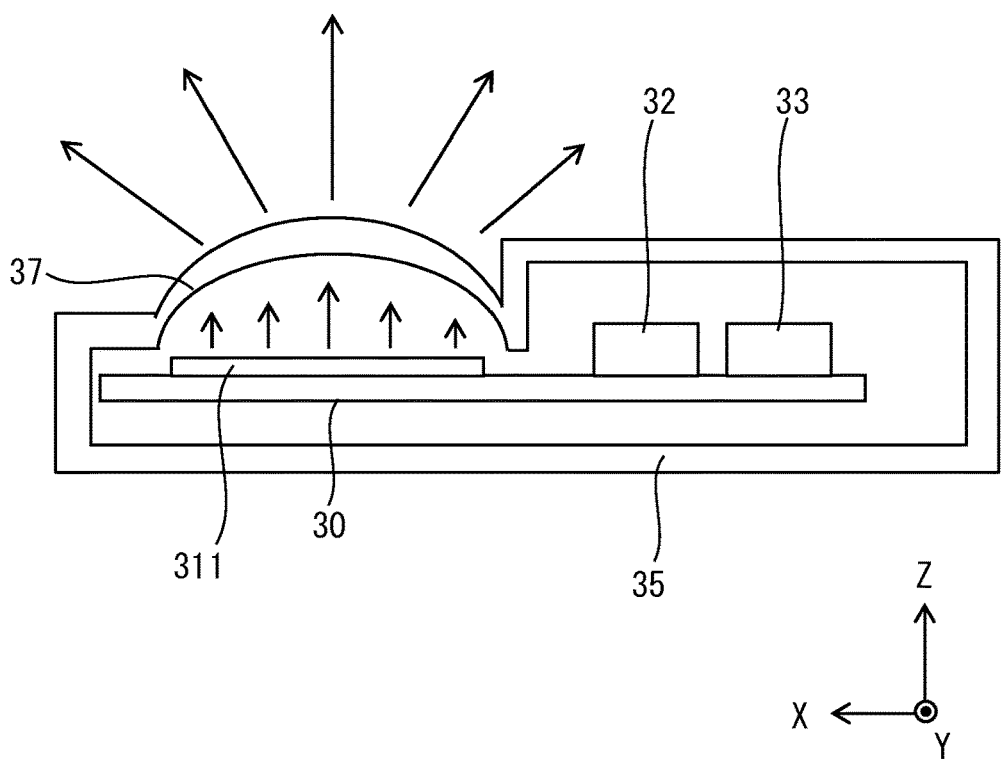
FIG. 24 is a diagram showing a configuration of a vehicular exterior right communication device in a fifth modification.

It is possible to adopt any resin material as the material of the prism 37. The prism 37 may bend the propagation direction of the radiated radio wave in the vehicular centrifugal direction by adopting the difference in the diffraction rate. FIG. 23 illustrates an embodiment that the prism 37 is formed as, for example, a dome shape. The particular shape may be modified appropriately. According to this modification, the shape of the prism 37 can be adjusted appropriately to attain the effect identical to the fourth modification. The prism 37 may be integrally formed with the housing 35 as shown in FIG. 24. In other words, a part of the housing 35 may function as the prism 37. As compared with the configuration without the prism 37, the prism 37 may cause the propagation direction of the radiated radio wave at least 5° closer to the vehicular centrifugal direction. The prism 37 may not have to completely direct the propagation path of the radiated radio wave in the vehicular centrifugal direction.

(Sixth Modification)

Figure 25:
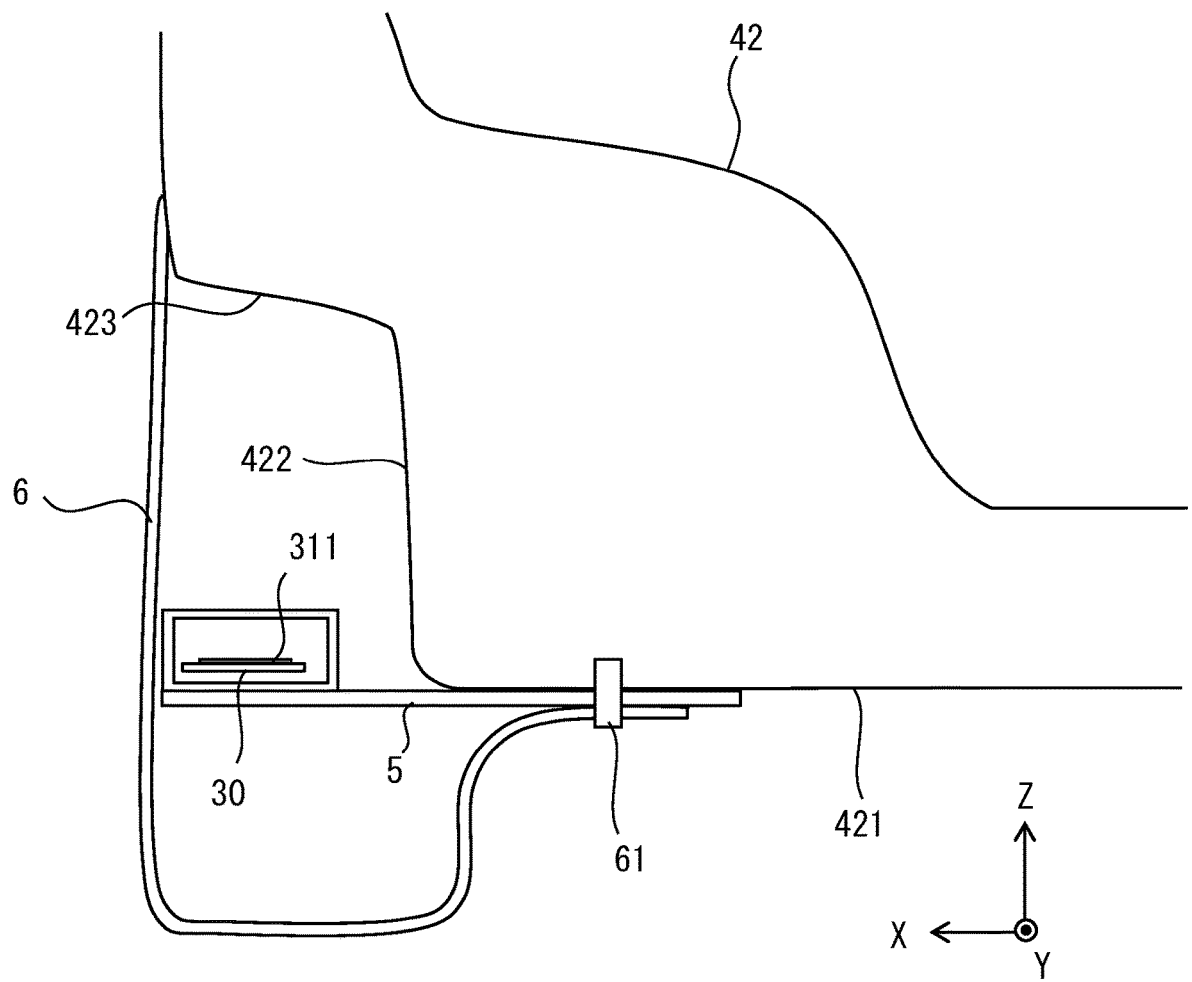
FIG. 25 is a diagram showing a modification of a mounting position of a compartment exterior communication device.

As illustrated in FIG. 25, the side sill 42 may have a side-sill side surface portion 422 having a multi-stage shape. The radiation element 311 as the antenna 31 may be attached with the main lobe facing upward in the vehicle. In the embodiment shown in FIG. 25, the second bottom portion 423 of the side sill is located in the central direction of the directivity. Since the second bottom portion 423 and the radiation element 311 are sufficiently separated in the height direction, the strong electrical field area may also be formed above the operating area Lx through diffraction.

(Seventh Modification)

Figure 26:
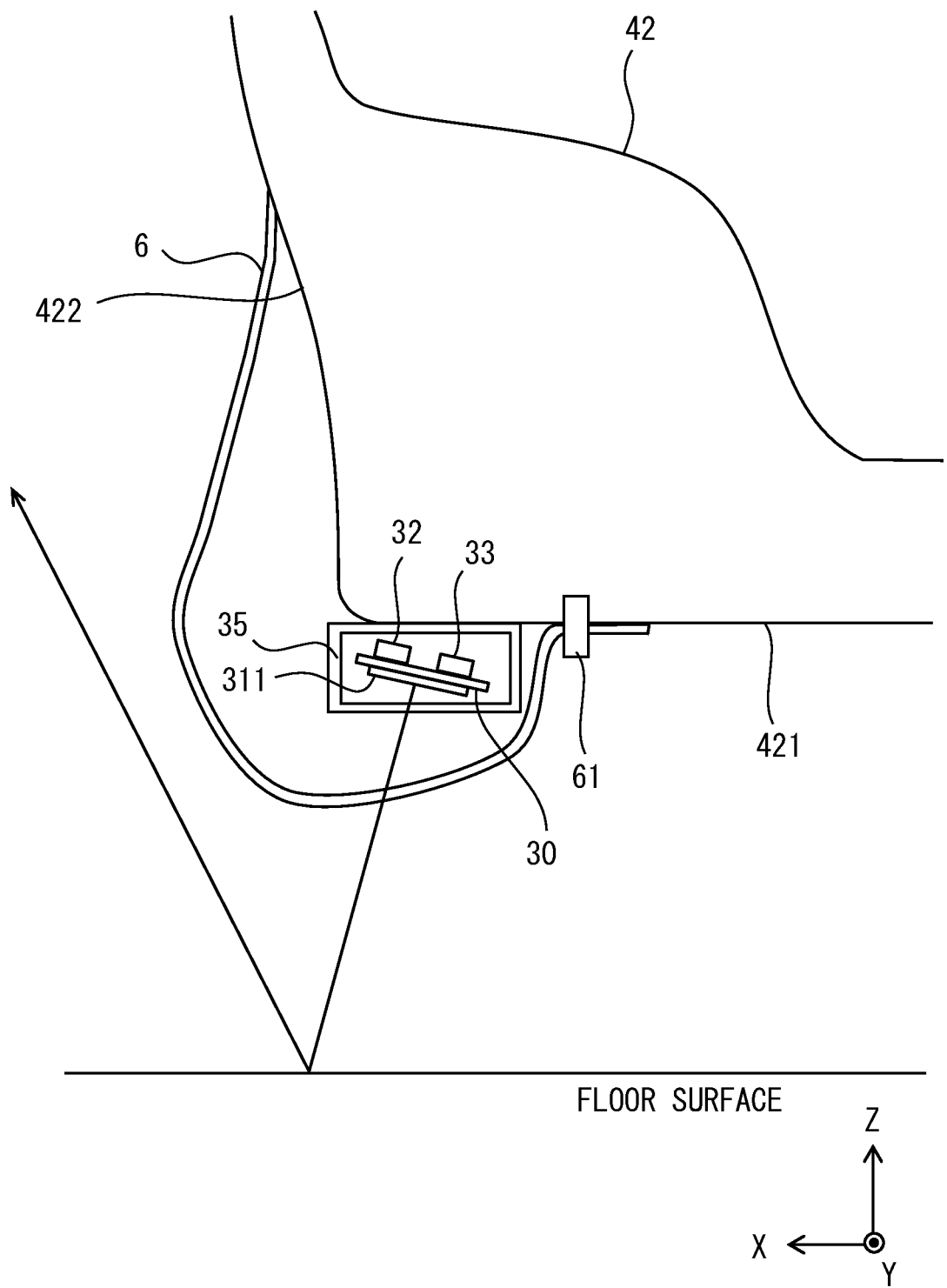
FIG. 26 is a diagram showing a modification of a mounting position of a compartment exterior communication device.

The above embodiment discloses an aspect such that a side communication device is attached in the vicinity of the bottom portion of the side sill 42 in a posture where the center of the directivity of the radiation element 311 faces upward in the vehicle. However, the configuration for forming the operating area Lx and the strong electrical field area is not limited to this situation. The side communication device (for example, vehicular exterior right communication device 12K) may be installed in the vicinity of the bottom portion of the side sill 42 in a posture such that the center of the directivity of the radiation element 311 faces downward as shown in FIG. 26, in view of the floor surface may function as a reflecting plate. Such a configuration also achieves the same effects as those of the embodiment described above. According to the present modification compared to the disclosed embodiment, since the propagation path of the radio wave from the radiation element 311 to the vicinity of the window 44 becomes longer, it is possible to enlarge the strong electrical field area formed in the vicinity of a front right side door 41A. The configuration disclosed in the present modification is not restricted to the posture in which the center of the directivity completely faces downward in the vehicle. The posture in which the center of the directivity faces downward by an angle of 45° or larger with respect to the vehicular horizontal plane corresponds to the posture in which the center of the directivity faces downward in the vehicle.

(Eighth Modification)

In the foregoing embodiments, the positioning system for vehicle according to the present disclosure is applied to the vehicle Hv having the metal body. However, the vehicle suitable as an application target of the positioning system for vehicle is not limited to the vehicle having the metal body. For example, the various body panels configuring the body of the vehicle Hv may be made of a carbon-based resin filled with a sufficient amount of carbon to attenuate the propagation of radio waves by 5 dB or more. A vehicle having the body described above is also suitable as an application target of the positioning system for vehicle.

The body panels of the vehicle Hv may be made of a general-purpose resin containing no carbon. In the case where the body panels of the vehicle Hv is made of a general-purpose resin containing no carbon, a specific metal pattern having a function of blocking the propagation of radio waves may be provided on the surface of the body panels. The metal pattern (hereinafter, referred to as a shield pattern) which has a function of blocking the propagation of the radio waves is a pattern in which fine wire conductors such as silver nanowires are arranged in a lattice pattern at intervals of 12 wavelengths or less of radio waves, for example. In this example, the thin line indicates a line width of 50 μm or less. The shield pattern described above can be realized by use of a metal surface structure.

The body of the vehicle Hv may be configured to block the propagation of the radio waves by coating a paint containing metal powder or carbon powder on the body made of the general-purpose resin. Further, a film for blocking the propagation of the radio waves (hereinafter, referred to as a shield film) may be attached to the body. A vehicle having the body described above is also suitable as an application target of the positioning system for vehicle.

(Ninth Modification)

Although the configuration in which the antenna 31 is installed at the side sill 42 in the posture where the center of the directivity faces upward in the vehicle (in other words, the positive Z-axis), the installation posture of the antenna 31 is not limited to this situation. The antenna 31 may be mounted in a posture in which the center of the directivity faces the vehicular centrifugal direction. In this situation, the configuration disclosed in the third to fifth modifications is adopted, and, for example, the reflector 36 and the prism 37 may be provided around the antenna 31 so that the strong electrical field area is formed above the vehicle.

(Other Modification)

The above embodiment describes that the in-vehicle communication device 12 integrally includes the antenna 31 and an electronic component such as the transceiver 32. However, it is not limited to this situation. The transceiver 32 and the communication microcomputer 33 may be stored in a housing different from the antenna 31. The shape of the side sill cover 6 may be modified as appropriate. Further, the side sill cover 6 is not an essential element and may be omitted.

The controller and the method therefor which have been described in the present disclosure may be also realized by a dedicated computer which constitutes a processor programmed to execute one or more functions concretized by computer programs. Also, the device and the method therefor which have been described in the present disclosure may be also realized by a special purpose hardware logic circuit. Also, the device and the method therefor which have been described in the present disclosure may be also realized by one or more dedicated computers which are constituted by combinations of a processor for executing computer programs and one or more hardware logic circuits. The computer program may be stored, as instructions to be executed by a computer, in a tangible non-transitory computer-readable medium. The controller herein includes a variety of ECUs included in the in-vehicle system 1 such as the smart ECU 11. The units or functions provided by the smart ECU 11 may be provided by software stored in a tangible memory device and a computer executing the software, only software, only hardware, or a combination of the software and the hardware. Some or all of the functions of the smart ECU 11 may be configured as hardware. A configuration in which a certain function is realized as hardware includes a configuration in which the function is realized by use of one or more ICs or the like.

Here, the flowchart described in this application or the process of the flowchart is composed of a plurality of sections (or referred to as steps), and each section is expressed as, for example, S101. Each section may be divided into several subsections, while several sections may be combined into one section. Furthermore, each section thus configured may be referred to as a device, module, or means.

The present disclosure has been described based on examples, but it is understood that the present disclosure is not limited to the examples or structures. The present disclosure encompasses various modifications and variations within the scope of equivalents. In addition, various combinations and configurations, as well as other combinations and configurations that include only one element, more, or less, fall within the scope and spirit of the present disclosure.

What is claimed is:

1. A positioning system comprising:
a vehicular exterior communication device that includes
an antenna configured to be disposed at a side surface portion of a vehicle, and receive a wireless signal transmitted from a portable terminal, the wireless signal being a radio wave of 1 GHz or higher, and
a strength detector configured to detect reception strength of the wireless signal received by the antenna;
a data communication device located inside the vehicle, the data communication device configured to execute data communication in a frequency-hopping mode with the portable terminal; and
a positioning device that is configured to determine whether or not the portable terminal is present at an operating area based on vehicular exterior device strength as the reception strength of the wireless signal from the portable terminal detected by the vehicular exterior communication device, the operating area being a region outside a vehicle compartment within a predetermined operating distance from the vehicle,
wherein:
the vehicular exterior communication device is configured to be attached to a side sill located below a door of the vehicle in a posture in which a center of directivity of the antenna faces upward or downward with respect to the vehicle; and
the positioning device is further configured to
acquire, from the data communication device, channel information indicative of a channel adopted for the data communication between the data communication device and the portable terminal based on a condition that the data communication device establishes communication connection with the portable terminal,
notify the vehicular exterior communication device of the channel information, and
cause the vehicular exterior communication device to detect the reception strength of the wireless signal from the portable terminal, in response to the vehicular exterior communication device receiving the notified channel information.

2. The positioning system according to claim 1, wherein the vehicular exterior communication device is configured to be installed in a posture in which a portion of a transmission signal is reflected towards a side of the vehicle at the side surface portion of the vehicle.

3. The positioning system according to claim 1 wherein the antenna is a directional antenna, and is configured to be installed in a posture in which the center of the directivity faces upward.

4. The positioning system according to claim 1, wherein the antenna is a directional antenna, and is configured to be installed in a posture in which the center of the directivity faces downward.

5. The positioning system according to claim 3, further comprising
a reflector configured to reflect an electromagnetic wave towards the side of the vehicle, and disposed in vicinity of the antenna.

6. The positioning system according to claim 4, further comprising
a prism configured to diffract propagation of the radio wave emitted by the antenna, and disposed in vicinity of the antenna.

7. The positioning system according to claim 1, wherein the vehicular exterior communication device is configured to be installed in a posture in which a polarized plane of the antenna is perpendicular to the side surface portion of the vehicle.

8. The positioning system according to claim 1, further comprising:
a vehicular interior communication device configured to
be disposed inside the vehicle compartment of the vehicle,
receive the wireless signal transmitted from the portable terminal, and
detect the reception strength of the received wireless signal,
wherein the positioning device is further configured to:
determine that the portable terminal is present inside the operating area, based on a condition that the vehicular exterior device strength as the reception strength detected by the vehicular exterior communication device is larger than or equal to a predetermined operating threshold value; and
determine that the portable terminal is present inside the vehicle compartment, based on a condition that vehicular interior device strength as the reception strength detected by the vehicular interior communication device is larger than or equal to a predetermined interior equivalent value.

9. The positioning system according to claim 1, further comprising
a vehicular interior communication device configured to
be disposed inside the vehicle compartment of the vehicle,
receive the wireless signal transmitted from the portable terminal, and
detect the reception strength of the received wireless signal,
wherein the positioning device is further configured to:
determine that the portable terminal is present inside the operating area, based on a condition that the vehicular exterior device strength as the reception strength detected by the vehicular exterior communication device is larger than or equal to a predetermined operating threshold value; and
determine that the portable terminal is present inside the vehicle compartment, based on a condition that the vehicular exterior device strength is less than the operating threshold and the reception strength detected by the vehicular interior communication device is larger than the vehicular exterior device strength.

10. The positioning system according to claim 1, wherein the antenna is a patch antenna or a linear antenna.

11. A positioning system comprising:
an antenna configured to be disposed at a side surface portion of a vehicle, and receive a wireless signal transmitted from a portable terminal, the wireless signal being a radio wave of 1 GHz or higher;
a strength detector configured to detect reception strength of the wireless signal received by the antenna;
a data communication device located inside the vehicle, the data communication device configured to execute data communication in a frequency-hopping mode with the portable terminal; and
a processor and a memory that stores instructions configured to, when executed by the processor, cause the processor to
determine whether or not the portable terminal is present at an operating area based on the reception strength of the wireless signal from the portable terminal detected by the strength detector, the operating area being a region outside a vehicle compartment within a predetermined operating distance from the vehicle,
acquire, from the data communication device, channel information indicative of a channel adopted for the data communication between the data communication device and the portable terminal based on a condition that the data communication device establishes communication connection with the portable terminal,
notify the strength detector of the channel information, and
cause the strength detector to detect the reception strength of the wireless signal, in response to the antenna receiving the notified channel information,
wherein:
the antenna and the strength detector are configured to be attached to a side sill located below a door of the vehicle in a posture in which a center of directivity of the antenna faces upward or downward with respect to the vehicle.

12. A device comprising:
an antenna configured to
receive a wireless signal transmitted from a portable terminal, the wireless signal being a radio wave of 1 GHz or higher, and
acquire, from a data communication device, channel information indicative of a channel adopted for communication connection in a frequency-hopping mode based on a condition that the communication connection is established between the portable terminal and the data communication device, the data communication device being located inside a vehicle; and
a strength detector configured to detect reception strength of the wireless signal in response to the antenna acquiring the channel information from the data communication device, the reception strength being adopted to determine whether or not the portable terminal is present at an operating area being a region outside a vehicle compartment within a predetermined operating distance from the vehicle,
wherein:
the antenna is further configured to be attached to a side sill below a door of a vehicle in a posture in which a center of directivity of the antenna faces upward or downward with respect to the vehicle.

13. The positioning system according to claim 1, wherein the positioning device is further configured to:
acquire a terminal ID of the portable terminal from the data communication device, based on a condition that the data communication device establishes the communication connection with the portable terminal;
notify the vehicular exterior communication device of the terminal ID; and
cause the vehicular exterior communication device to identify the portable terminal based on the notified terminal ID.

14. A positioning system comprising:
a vehicular exterior communication device that includes
an antenna configured to be disposed at a side surface portion of a vehicle, and receive a wireless signal transmitted from a portable terminal, the wireless signal being a radio wave of 1 GHz or higher, and
a strength detector configured to detect reception strength of the wireless signal received by the antenna;
a data communication device located inside the vehicle, the data communication device configured to execute data communication in a frequency-hopping mode with the portable terminal; and
a positioning device that is configured to determine whether or not the portable terminal is present at an operating area based on vehicular exterior device strength as the reception strength of the wireless signal from the portable terminal detected by the vehicular exterior communication device, the operating area being a region outside a vehicle compartment within a predetermined operating distance from the vehicle,
wherein:
the vehicular exterior communication device is configured to be located on a bracket fixed to a side sill of the vehicle in a posture in which a center of directivity of the antenna faces upward or downward with respect to the vehicle.

15. The positioning system according to claim 14, wherein the bracket is fixed to a bottom surface of the side sill of the vehicle.

16. The positioning system according to claim 14, wherein:
the bracket includes a main body and a reflector;
the vehicular exterior communication device is located on the main body; and
a range of an angle formed between the main body and the reflector is between 60 to 90 degrees.

17. The positioning system according to claim 14, further comprising:
a side sill cover being fixed to the side sill via the bracket to enclose the vehicular exterior communication device.

18. The positioning system according to claim 14, wherein the vehicular exterior communication device is located on a portion of the bracket extending from the side sill.

* * * * *